United States Patent [19]
Sfarti et al.

[11] Patent Number: 5,798,762
[45] Date of Patent: Aug. 25, 1998

[54] CONTROLLING A REAL-TIME RENDERING ENGINE USING A LIST-BASED CONTROL MECHANISM

[75] Inventors: Adrian Sfarti; Nicholas Robert Baker, both of Sunnyvale; Robert William Laker, Fremont; Adam Craig Malamy, Palo Alto, all of Calif.

[73] Assignee: Cagent Technologies, Inc., Redwood City, Calif.

[21] Appl. No.: 438,860

[22] Filed: May 10, 1995

[51] Int. Cl.$^6$ ............................................. G06T 15/00
[52] U.S. Cl. ........................ 345/420; 345/514; 345/522
[58] Field of Search ............................ 395/120, 119, 395/507, 513, 516, 522–3; 345/419–20, 4, 514, 516–7, 521–3

[56] References Cited

U.S. PATENT DOCUMENTS

| | | | |
|---|---|---|---|
| 4,291,380 | 9/1981 | Rohner | 364/522 |
| 4,492,956 | 1/1985 | Collmeyer et al. | 340/723 |
| 4,496,944 | 1/1985 | Collmeyer et al. | 340/723 |
| 4,760,390 | 7/1988 | Maine et al. | 340/747 |
| 4,930,092 | 5/1990 | Reilly | 364/522 |
| 5,051,737 | 9/1991 | Akeley et al. | 340/747 |
| 5,097,427 | 3/1992 | Lathrop et al. | 395/130 |
| 5,113,490 | 5/1992 | Winget | 395/119 |
| 5,224,208 | 6/1993 | Miller, Jr. et al. | 395/125 |
| 5,315,698 | 5/1994 | Case et al. | 395/162 |
| 5,533,176 | 7/1996 | Best et al. | 395/117 |
| 5,596,691 | 1/1997 | Good et al. | 395/140 |
| 5,604,843 | 2/1997 | Shaw et al. | 395/101 |

OTHER PUBLICATIONS

Wasson, Gregory, "Graphic traffic: file–conversion tricks" (Tutorial), *Computer Shopper*, v12, N5, p. 676(6), May, 1992.

Grunin, Lori, "The image crusaders: 12 screen capture & conversion utilities", *PC Magazine*, v12, N7, p. 221(23), Apr. 13, 1993.

Vaughn–Nichols, S., et al., "Graphical voodoo", (Tutorial) *Computer Shopper*, v14, N10, p. 610(3), Oct., 1994.

Simone, Luisa, "Vector file–conversion utilities", *PC Magazine*, v10, N2, p. 243(11), Jan. 29, 1991.

Graef, Gerald L., :A Close Look at GIF, TIFF and Other Attempts at a Universal Image Format", *Byte Magazine*, vol. 14, No. 9, p. 305, Sep., 1989.

Prosise, Jeff, "Understanding Modelview Transformations in OpenGL for Windows NT," Microsoft Systems Journal, vol. 10, No. 2, p. 19(18), Feb.,1995.

Blinn, James F., "A Trip down the Graphics Pipeline: the Homogeneous Perspective Transform," IEEE Computer Graphics and Applications, vol. 13, No. 3, May, 1993, pp. 75–80.

Blinn, James F., "Hyperbolic Interpolation," IEEE Computer Graphics and Applications, vol. 12, No. 4, Jul., 1992, pp. 89–94.

M.F. Deering & S.R. Nelson; Leo: A System for Cost Effective 3D Shaded Graphics; Sun Microsystems Computer Corporation ACM, S. ggraph '93' Annual Conference, pp. 101–108, 1993.

*Primary Examiner*—Phu K. Nguyen
*Assistant Examiner*—Rudolph Buchel
*Attorney, Agent, or Firm*—Fenwick & West LLP

[57] ABSTRACT

A system and method for controlling a real-time rendering engine includes a control program for defining in regions of system memory a block header and a list of flow-control instructions.

10 Claims, 7 Drawing Sheets

FIGURE 3

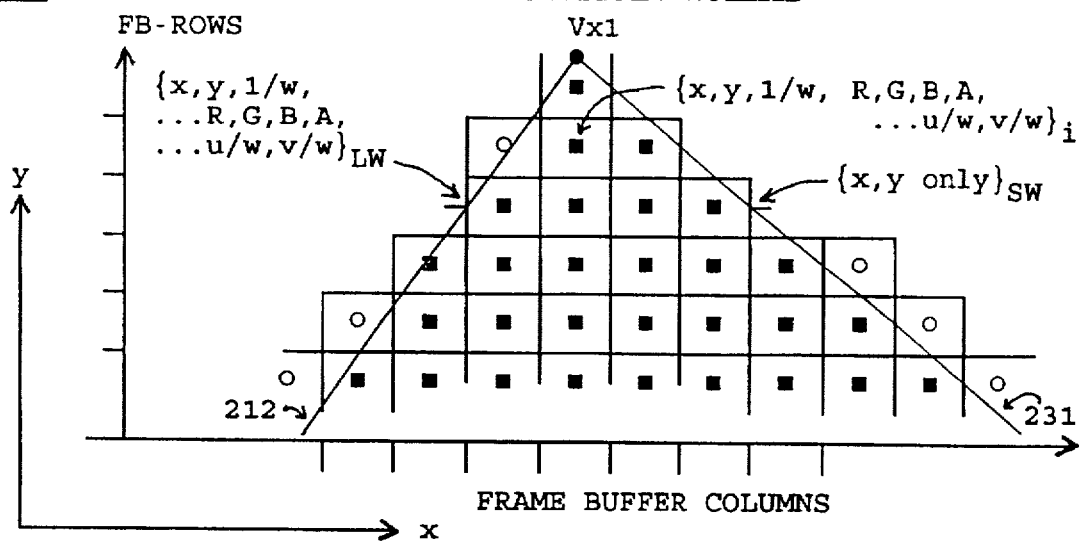

300 EDGE/SPAN-WALKS

410 — CPU TASKS
> (Import/build 3d object frameworks)
> Transform (rotate, scale, distort, etc )
> Clip
> Define lighting
> Project lighting onto exposed surfaces
> Remove frameworks of hidden surfaces
> Construct vertex-based draw lists
> Set TE to work on desired lists
> Intervene on TE workflow when necessary

415 ↓   ↑ 455

450 — TRIANGLE ENGINE TASKS
> Fetch worklist
> Build triangle (3 vertices, strip, fan)
> Sort vertices (*)
> Compute walker gradients (*)
> Walk along edges in FB space
> Walk across span in FB space
> Map to texture plane & fetch texture
> Blend texture into interpolated span color
> Blend current FB color into mix
> Test depth & cond write of new FB color
> Do next triangle

CONTROLLING A REAL-TIME RENDERING ENGINE USING A LIST-BASED CONTROL MECHANISM

BACKGROUND

1. Field of the Invention

The invention relates generally to digital image processing and the display of digitally generated images.

The invention relates more specifically to the problem of creating raster-based, high-resolution animated images in real time with the aid of a 3D rendering engine.

2. Cross Reference to Related Applications

This application is related to the following copending applications:

(a) PCT Patent Application Serial No. PCT/US92/09342, entitled RESOLUTION ENHANCEMENT FOR VIDEO DISPLAY USING MULTI-LINE INTERPOLATION, by inventors Mical et al., filed Nov. 2, 1992, [Attorney Docket No. MDIO3050,] and also to U.S. patent application Ser. No. 07/970,287, now U.S. Pat. No. 5,481,275 bearing the same title, same inventors and also filed Nov. 2, 1992;

(b) PCT Patent Application Serial No. PCT/US92/09349, entitled AUDIO/VIDEO COMPUTER ARCHITECTURE, by inventors Mical et al., filed Nov. 2, 1992, [Attorney Docket No. MDIO4222,] and also to U.S. patent application Ser. No. 07/970,308, now abandoned, bearing the same title, same inventors and also filed Nov. 2, 1992;

(c) PCT Patent Application Serial No. PCT/US92/09350, entitled METHOD FOR CONTROLLING A SPRYTE RENDERING PROCESSOR, by inventors Mical et al., filed Nov. 2, 1992, [Attorney Docket No. MDIO3040,] and also to U.S. patent application Ser. No. 07/970,278, now abandoned, bearing the same title, same inventors and also filed Nov. 2, 1992;

(d) PCT Patent Application Serial No. PCT/US92/09462, entitled SPRYTE RENDERING SYSTEM WITH IMPROVED CORNER CALCULATING ENGINE AND IMPROVED POLYGON-PAINT ENGINE, by inventors Needle et al., filed Nov. 2, 1992, [Attorney Docket No. MDIO4232,] and also to U.S. patent application Ser. No. 07/970,289, now abandoned, bearing the same title, same inventors and also filed Nov. 2, 1992;

(e) PCT Patent Application Serial No. PCT/US92/09460, entitled METHOD AND APPARATUS FOR UPDATING A CLUT DURING HORIZONTAL BLANKING, by inventors Mical et al., filed Nov. 2, 1992, [Attorney Docket No. MDIO4250,] and also to U.S. patent application Ser. No. 07/969,994, now abandoned, bearing the same title, same inventors and also filed Nov. 2, 1992;

(f) PCT Patent Application Serial No. PCT/US92/09467, entitled IMPROVED METHOD AND APPARATUS FOR PROCESSING IMAGE DATA, by inventors Mical et al., filed Nov. 2, 1992, [Attorney Docket No. MDIO4230,] and also to U.S. patent application Ser. No. 07/970,083, now U.S. Pat. No. 5,572,235 bearing the same title, same inventors and also filed Nov. 2, 1992;

(g) PCT Patent Application Serial No. PCT/US94/12521, entitled DISPLAY LIST MANAGEMENT MECHANISM FOR REAL-TIME CONTROL OF BY-THE-LINE MODIFIABLE VIDEO DISPLAY SYSTEM, by inventors Robert Joseph Mical et al., filed Nov. 1, 1994, [Attorney Docket No. MDIO4255,] and also to U.S. patent application Ser. No. 08/146,505, now U.S. Pat. No. 5,502,462 bearing the same title, same inventors and filed Nov. 1, 1993;

(h) U.S. patent application Ser. No. 08/311,192 entitled REAL TIME DECOMPRESSION AND POST-DECOMPRESS MANIPULATION OF COMPRESSED FULL MOTION VIDEO, by inventors Steve C. Wasserman et al., filed Sep. 23, 1994 [Attorney Docket No. MDIO4370]; and (i) U.S. patent application Ser. No. 08/438,630 entitled CONFIGURABLE VIDEO DISPLAY SYSTEM HAVING LIST-BASED CONTROL MECHANISM FOR BY-THE-LINE AND BY-THE-PIXEL MODIFICATION OF DISPLAYED FRAMES AND METHOD OF OPERATING SAME by inventors Richard W. Thaik et al., filed concurrently herewith [Attorney Docket No. MDIO4510].

The related patent applications are all commonly assigned with the present application and are all incorporated herein by reference in their entirety.

3. Description of the Related Art

In recent years, the presentation and pre-presentation processing of visual imagery has shifted from what was primarily an analog electronic format to an essentially digital format.

Unique problems come to play in the digital processing of image data and the display of such image data.

The more prominent problems include providing adequate storage capacity for digital image data and maintaining acceptable data throughput rates while using hardware of relatively low cost. In addition, there is the problem of creating a sense of realism in digitally generated imagery, particularly in animated forms of such imagery.

The visual realism of imagery that is generated by digital video game systems, by simulators and the like can be enhanced by providing special effects such as, but not limited to, making real-time changes in the orientation and/or shadowing and/or highlighting of various objects, smoothing or sharpening the contours of various objects at different times, and so forth.

Visual realism can be further enhanced by projecting 3-dimensional surface definitions onto a 2-dimensional display area and rotating, scaling or otherwise manipulating the 3-dimensional surface definitions in real time prior to their projection onto the 2-dimensional display area.

Visual realism can be additionally enhanced by increasing the apparent resolution of a displayed image so that it has a smooth photography-like quality rather than a grainy disjoined-blocks appearance of the type found in low-resolution computer-produced graphics of earlier years.

Visual realism can be even further enhanced by increasing the total number of different colors and/or shades in each displayed frame of an image so that, in regions where colors and/or shades are to change in a smooth continuum by subtle degrees of hue/intensity, the observer perceives such a smooth photography-like variation of hue/intensity rather than a stark and grainy jump from one discrete color/shade to another.

Although bit-mapped computer images originate as a matrix of discrete lit or unlit pixels, the human eye can be fooled into perceiving an image having the desired photography-like continuity if the displayed matrix of independently-shaded (and/or independently colored) pixels has dimensions of approximately 500-by-500 pixels or better at the point of display and a large variety of colors and/or shades on the order of roughly 24 bits-per-pixel or better.

The human brain can be tricked into perceiving a displayed 2-dimensional moving image as being somewhat 3-dimensional in nature if a sufficient number of cues are generated in real-time to support such perception. These cues include but are not limited to:

(a) drawing images along angled lines of perspective to create a sense of depth;

(b) shading images to simulate 3-dimensional lighting effects including shadows and reflections;

(c) allowing displayed objects to rotate so as to show their side and back surfaces;

(d) allowing displayed objects to appear to move forward and back relative to the viewer by appropriately scaling their size; and (e) allowing displayed objects to move in front of one another as if they were 3-dimensional and had all the associated properties of the real objects they portray.

The above set of visual cues imply that each rotating object having reflective surfaces needs to have its correspondingly surrounding 3D visual environment wrapped about its surface, and distorted in accordance with the contours of its surface in order to create the illusion of 3-dimensional reflection. The above set of visual cues further presuppose that translucent moving objects passing in front of other objects should appear to translucently pass through the imagery of the object behind.

Carrying out all these 3D cuing operations in real-time can be quite complicated and difficult, particularly if an additional constraint is added that the implementing hardware has to be of relatively small size and low cost.

Compound systems are being proposed that have real-time 3-dimensional object defining and manipulating means as well as other means that contend for access to a shared system memory and for access to the shared resources of system CPU's.

The compound nature of such systems places a strain on system memory to deliver (or to store) time-critical data to (or from) devices or modules that need to operate on a real-time basis.

An example of time-critical data is video data that may be needed on a real-time basis, within the time window of a horizontal raster line for example, in order to provide real-time display for an interactive game or an interactive simulator.

The compound nature of such systems also increases the likelihood that a minor software error (bug) in one software module will induce an unintended write to a system critical register or memory location and bring the whole system down.

The proposed compound systems have so many hardware and software functionalities that they strain the throughput capabilities (data bandwidth) of the memory-access management subsystem and complicate the tasks of the memory-access management subsystem. The memory-access management subsystem now needs to arbitrate among a larger number of contenders for memory access.

The added functionalities of the proposed compound systems additionally strain the throughput capabilities and complicate the tasks of any system CPU's that have to supervise the activities of the image manipulating and rendering means on a real-time basis. (The term "CPU's" refers here to a general-purpose data processing subsystem which may be implemented either in a centralized unit format, as for example a single truly-central processing unit; or which may be implemented in a plural units format, such as in a parallel processing system.)

A system architecture is needed for reducing contention among plural potential requesters for system memory access.

A system architecture is needed for reducing contention by plural software modules for access to the limited resources of system CPU's.

A methodology is needed for simultaneously satisfying the needs of multiple, time-critical processes such as those of a real-time video display subsystem and those of a real-time animation subsystem.

A methodology is needed for reducing the likelihood that a wayward software or hardware module will bring down the entire system by unintentionally writing to a system critical register or memory location.

SUMMARY OF THE INVENTION

The above-mentioned problems are overcome in accordance with the invention by providing a graphics system that has a multi-port memory subsystem storing image-rendering control lists and that further has a real-time programmably-configurable render-engine (also referred to herein as the 'triangle-engine' or 'TE') coupled to the memory subsystem and responsive to the stored image-rendering control lists as well as to supervisory immediate control commands issued by a supervisory CPU or the like.

A triangle-engine in accordance with the invention reduces the load on system memory and on system CPU's by periodically fetching compact render-control lists and source image data from the memory subsystem on a list basis and by processing the fetched information without requiring continuous real-time intervention by system CPU's. This frees the system CPU (or CPU's) for managing other time-critical tasks of the graphics system.

One embodiment of a triangle-engine (TE) in accordance with the invention includes an addressable register set that is programmable by one or both of a system CPU and a memory-resident control-list for programmably reconfiguring the TE in real-time to perform various image rendering operations such as surface color fill, surface texturing and hiding of overlapped surfaces.

The one embodiment of the triangle-engine (TE) includes a linked-list instructions-fetch means (also referred to herein as a 'vertex-fetch' module or 'VFMI') for fetching from system memory, a compact set of draw instructions that are based on 3-dimensional vector-point models of object surfaces to be rendered and displayed.

'Rendering' refers herein to the step of writing data into a frame-buffer portion (FB) of memory irrespective of whether that FB is the currently-being-displayed 'active' FB or a later-to-be-displayed alternate FB.

'Displaying' refers herein to the step of reading data from an active frame-buffer and transforming the read data into a video signal for viewing on a video monitor or the like.

The TE embodiment further includes control derivation means (also referred to herein as a 'set-up' module) for deriving span-walking control data from the vector-based modeling data fetched by the vertex module so that lines and/or areas bounded by vertex points may be stepped across and so that bounded areas may be filled with corresponding colors in accordance with a bi-linear interpolation scheme.

The TE embodiment additionally includes an edge-walker module (EWM), responsive to edge-walking control data (supplied from the set-up module or elsewhere), for defining by means of interpolation, various image-defining parameters distributed at points along a first line having a respective set of two pre-defined vertex points, and for defining by means of similar interpolation, a subset of similar parameters distributed at opposed points along a second line having a respective set of two pre-defined vertex points. (In one embodiment, the point parameter subset of the second walked edge consists of only x and y for each point while the parameter set of the first walked edge includes in addition to x and y, further point parameters, 1/w, R, G, B, A, u/w, and v/w.) The edge-walker module also determines which frame-buffer pixels are to be considered 'inside' a walked triangle and which are to be deemed 'outside'. Rendering activities for a given triangle are limited to frame-buffer pixels 'inside' the walked triangle.

The image-defining parameters of points of a walked triangle include but are not limited to:

(a) native-surface color component values such as R, G, and B that are respectively attached to each point;

(b) a blending factor referred to herein as 'A' that is respectively attached to each point and is used for blending the native-surface color component values with respective original frame-buffer values and/or respective texturizing values;

(c) perspective-normalized texture mapping coordinates that are respectively attached to each point and are referred to herein as 'u/w' and 'v/w', where u and v are coordinates of a bitmapped 2-dimensional texture image having its own R, G, B, and/or A values for each of its points, and where w is a linear function of depth ($w=\alpha z+\beta$); and (d) a perspective-normalized depth factor referred to herein as '1/w'.

The TE additionally includes a span-walker module (SWM), responsive to span-walking control data (supplied from the set-up module and/or from the edge-walker module or elsewhere), for defining by means of bi-linear interpolation, various image-defining parameters along a third line having two pre-defined end points. The end points of the third line are usually defined by the edge-walker module as the edge-walker module steps pair-wise to the next set of points along the vertex-defined first and second lines. The image-defining parameters for interior points (IP) of the triangle that are similar to those of the edge-walker module (R, G, B, A, u/w, v/w and 1/w). Span-walking may be thought of as a pre-render parameter filling for an area between two edge lines.

The TE embodiment additionally includes a texture-mapping module (TMM), responsive to span-walker result data (supplied from the span-walker module or elsewhere), for defining by means of perspective-normalized mapping, what texture pixels are to be blended, if at all, with the native pixels of a span-walked area.

The TE embodiment additionally includes a data blending module (DBM), operatively coupled to the span-walker module (SWM), to the texture-mapping module (TMM), to a frame-buffer (FB) and to a perspective-normalized depth buffer (1/w-buffer), for blending together the outputs of the SWM and the TMM and the current contents of the FB and, depending on a programmably-definable comparison of a current-pixel depth-value with a corresponding value in the 1/w-buffer, writing the blended value back to the frame-buffer (FB).

A render-control list is provided within system memory in accordance with the invention for controlling the TE. The render-control list includes a block-header that defines the size (instructions-count) of a succeeding list of instructions and the nature of the instructions (e.g., long-format versus short-format).

The block-header includes a hardware version-number field for identifying versions of hardware that may or may not execute the succeeding list of instructions.

The block-header also includes a vertex replace-mode field for controlling automatic generation of 'strip' and 'fan' forms of triangle chains.

The block-header further includes function enable/bypass fields for programmably enabling on a block-by-block basis, a shading function that applies native shades to portions of the to-be-rendered area, a texturing function that applies textures to portions of the to-be-rendered area, and a perspective weight and use function that applies normalized perspective values to portions of the to-be-rendered area and that uses those normalized perspective values for deciding whether one or another of two surfaces is to overlap the other (similar to z-buffering). Processing time can be shortened by bypassing those functions that have no substantial effect on the final rendering. Data structures within the block contract accordingly.

For example, if all texture blend factors $A_t$ of a to-be-applied texture are such that the texture bitmap will essentially hide all of the surface native coloration, then the native-surface shading function should be bypassed to avoid wasting time on computations that are of no essential consequence to the final rendering.

A variety of rendering effects can be obtained by, for example, modulating the various fields of each block-header. Further rendering effects can be obtained by re-arranging the order in which vertex information is listed in the block. Yet further rendering effects can be obtained by reconfiguring the settings of the control register set in the triangle-engine (TE). These and other options will become apparent in the below detailed description.

One of the notable features of the triangle-engine (TE) is that certain of its control registers may be modified only by a command-giving device (e.g., CPU) that is deemed to be a 'privileged supervisor' as opposed to another accessing device that is not priveleged. If a non-privileged device tries to modify a privileged register, an access violation interrupt is generated by the TE. This prevents wayward software from taking control of the TE (via the deferred instructions path) and directing the TE to write over unintended, crucial areas of system memory, thereby crashing the system.

The above and other features of the graphics system will become clearer by referring to the below detailed description.

BRIEF DESCRIPTION OF THE DRAWINGS

The below detailed description makes reference to the accompanying drawings, in which:

FIG. 3 is a 2D plot for explaining how an edge-walker steps through frame-buffer space, down a long edge of a triangle and defines render start and stop pixels for a subsequent span-walker.

FIG. 4 is a block diagram showing pipelined subdivision of tasks between the CPU and the triangle engine;

DETAILED DESCRIPTION

Figure 1A:
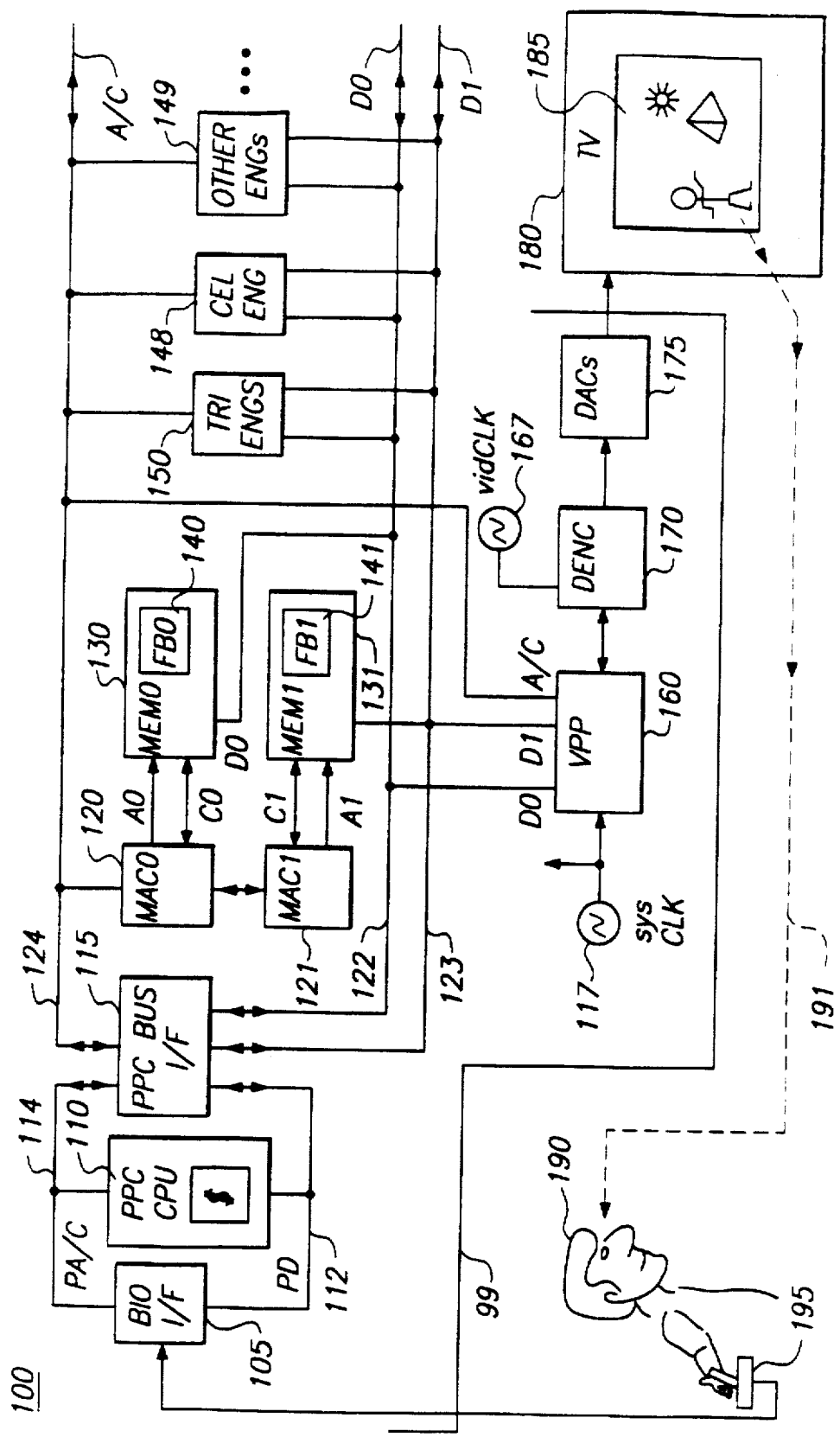
FIG. 1A is a block diagram of a graphics system in accordance with the invention that includes a programmably-configurable triangle-engine (TE)

Referring to FIG. 1A, a block diagram of an image processing, rendering and display system 100 (graphics system 100) in accordance with the invention is shown.

A key feature of system 100 is that it is relatively low in cost and yet it provides mechanisms for handling complex, 3-dimensional (3D) image scenes in real time and displaying them such that they appear to have relatively high resolution and a wide variety of colors and/or shades per displayed frame.

This feature is made possible in part by including within the system 100, a triangle-engine (TE) 150 that renders image data into a frame-buffer (FB) of system memory on a real-time basis.

This feature is further made possible by including within the system 100, an Image-Enhancing And Rendering Subsystem (I-EARS) comprised of: a video post-processor (VPP) 160, a digital encoder (DENC) 170, and a plurality of digital-to-analog converters (DAC's) 175.

The triangle-engine (TE) 150 and the image-enhancing and rendering subsystem (I-EARS) 160-170-175 may each be formed within one integrated circuit (IC) chip or may be distributed across a few IC chips. In one particular embodiment, elements 150, 160, 170 and 175 are implemented within one integrated circuit (IC) chip together with elements 115, 120, 121, 122, 123, 124, and 148 of FIG. 1A. This one IC chip is referred to herein as the 'I-EARS chip'.

Within the I-EARS group of elements, 160-170-175, there is provided one or more of: a set of user-programmable Color LookUp Table modules (CLUT's, not shown) for defining on a per scanline basis, a palette of colors available for display; an image dithering circuit (not shown); and an image filtering circuit (not shown). The functions of the image dithering circuit (not shown) and image filtering circuit (not shown) can be programmably bypassed on a by-the-pixel basis. Also optionally provided, are a hardwired pseudo-linear CLUT circuit (not shown) which can be programmably substituted for one of the user-programmable CLUT's on a by-the-pixel basis; and a user-programmable resolution-enhancing interpolator (not shown) which can be used to produce twice as many unique display lines and/or twice as many unique display columns as there are respective lines and columns in the active frame-buffer. A more detailed description of the I-EARS group of elements, 160-170-175, may be found in the above-referenced U.S. patent application entitled CONFIGURABLE VIDEO DISPLAY SYSTEM HAVING LIST-BASED CONTROL MECHANISM FOR BY-THE-LINE AND BY-THE-PIXEL MODIFICATION OF DISPLAYED FRAMES AND METHOD OF OPERATING SAME [Attorney Docket No. MDI04510], which is incorporated herein by reference and as whose details will therefor not be repeated here.

Figure 1B:
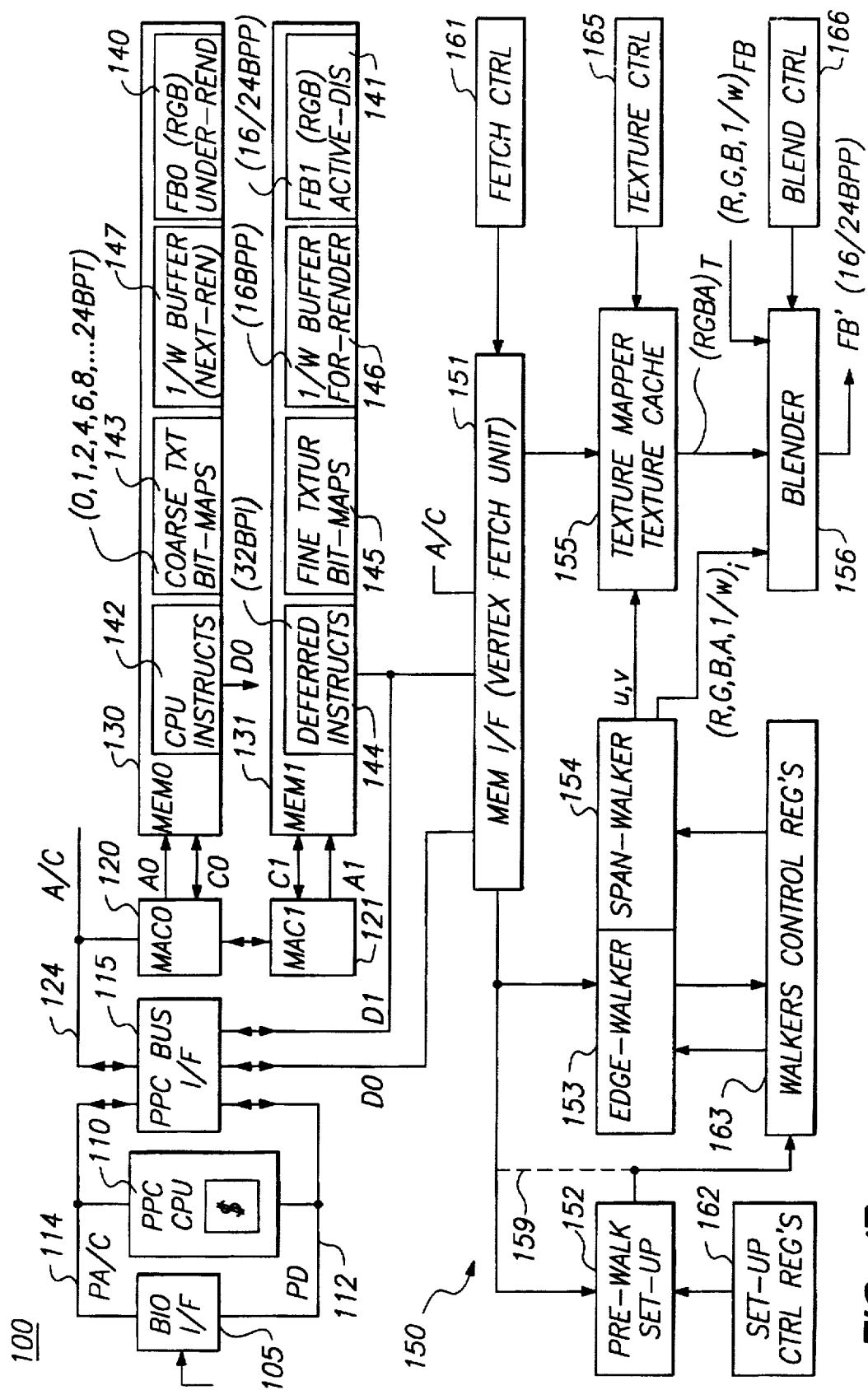
FIG. 1B is a close-up block diagram showing more details of a triangle-engine (TE) in accordance with the invention and the parts of the graphics system with which the TE interacts.

(Note that elements referenced by numerals in the '100' number series generally appear in FIGS. 1A-1B, those referenced by numerals in the '200' number series generally appear in FIG. 2, and so forth.)

The operations and importance of the triangle-engine (TE) 150 and various data blocks within system memory may be better appreciated by first considering the video processing operations of graphics system 100 in an overall sense.

Except as otherwise stated, all or most parts of system 100 are implemented on a single printed circuit board 99 and the circuit components are defined within one or a plurality of integrated circuit (IC) chips mounted to the board 99. Except as otherwise stated, all or most of the circuitry is preferably implemented in CMOS (complementary metal-oxide-semiconductor) technology using 0.5 micron or narrower line widths. An off-board power supply (not shown) delivers electrical power to the board 99.

System 100 includes a real-time video display unit (VDU) 180 such as an NTSC standard television monitor or a PAL standard television monitor or a 640-by-480 VGA computer monitor or a higher-resolution monitor. The VDU 180 is used for displaying high-resolution animated images 185 to a system user 190.

The video display unit (VDU) 180 may also include audio output means (not shown) for simultaneously producing and supplying corresponding multi-phonic or monophonic sound to the system user 190. Alternatively, such audio output means (not shown) is provided separately from the VDU. Although not shown, it is understood that system 100 may include appropriate audio signal generating circuitry for driving the audio output means (not shown) and that the audio signal generating circuitry (not shown) may include digital audio synthesis circuitry for creating effects in synchronism with the displayed image 185 that give the impression of 3-dimensional sound (echoes, Doppler effect and so forth).

As the image-enhancing and rendering subsystem (I-EARS) 160-170-175 drives the video display unit (VDU) 180, a system user 190 observes the displayed imagery 185 and hears any accompanying audio by way of audio-visual coupling path 191. An interactive response mechanism 195 is provided in the form for example of a joystick and/or a pad of push-buttons for allowing the system user 190 to feedback to the hardware (e.g., CPU 110) his or her real-time responses to the perceived audiovisual show by way of interface 105.

The image-enhancing and rendering subsystem (I-EARS) 160-170-175 has a pipelined structure that moves data signals synchronously from an upstream portion to a downstream portion. The downstream portion of the I-EARS 160-170-175 is clocked by a video clock generator (vidCLK) 167 that operates according to pre-specified pixel and control rates of the VDU 180. In one embodiment, the vidCLK rate is approximately 15 MHz.

The digital encoder (DENC) 170 includes a timing section that generates frame synchronization signals such as a vertical synch pulses (V-synch) and horizontal synch pulses (H-synch) in synchronism with the vidCLK 167.

The upstream portion of the I-EARS 160-170-175 is clocked by a system clock generator (sysCLK) 117 that operates according to a pre-specified system rate. The system rate is typically different from the vidCLK rate. In one embodiment, the sysCLK rate is approximately 66 MHz. The sysCLK 117 is used for driving other portions of system 100 such as the illustrated CPU 110 and triangle-engine 150.

System 100 further includes a real-time audiovisual-data processing subsystem comprised of: a basic I/O interface module 105, a general purpose central-processing unit (CPU) 110, a multi-port memory 130–131, a plurality of 2-dimensional image rendering engines (cel-engines) 148, and the already-mentioned 3-dimensional image rendering engine (triangle-engine) 150. An example of the 2-dimensional image rendering engines (cel-engines) 148 may be found in the above-incorporated U.S. patent application Ser. No. 07/970,289, entitled SPRYTE RENDERING SYSTEM WITH IMPROVED CORNER CALCULATING ENGINE AND IMPROVED POLYGON-PAINT ENGINE, by inventors Needle et al.

The real-time audiovisual-data processing subsystem may include other image-data manipulating engines and audio-data manipulating engines as indicated at 149.

In one embodiment, the memory 130–131 is formed as two simultaneously and independently addressable units, 130 and 131. Data in system memory 130–131 is preferably interleaved across a same address space as 4-KByte pages. Units 130 and 131 preferably utilize SDRAM technology (synchronous dynamic random access memory). They may also utilize other high-speed random access data storage technologies such as video-speed static random-access memory subunit (VSRAM).

Access to the first memory unit (MEM0) 130 is managed by a corresponding first memory access control unit (MAC0) 120.

Access to the second memory unit (MEM1) 131 is managed by a respective and independent second memory access control unit (MAC1) 121.

The MAC0 unit 120 may exercise exclusive control over the address (A0) and control (C0) buses of the first memory unit 130. Any other device which wishes to gain access to the A0 and C0 buses then has to send a corresponding request to the MAC0 unit 120 over address/control bus 124. The MAC0 unit 120 arbitrates among contending requestors and grants access to the highest priority requester.

Similarly, the MAC1 unit 121 may exercise exclusive control over the address (A1) and control (C1) buses of the second memory unit 131. Any other device which wishes to gain access to the A1 and C1 buses then has to send a corresponding request to the MAC1 unit 121 over address/control bus 124. The MAC1 unit 121 arbitrates among contending requestors and grants access to the highest priority requester.

The first memory unit 130 has a 32-bit wide bidirectional data bus 122 which is also designated as 'D0'. The second memory unit 131 has a 32-bit wide bidirectional data bus 123 which is also designated as 'D1'. Devices such as CPU 110, VPP 160 and triangle-engine 150, read and write data into memory units 130 and 131 by way of respective data buses D0 and D1. The total data bus width is thus 64 bits.

If desired, the illustrated, parallel memory architecture may be expanded to include additional memory units (MEM's) such as 130–131 interleaved address-wise with units 130–131 and respective additional memory access control units (MAC's) such as 120–121. The advantage of this parallel memory architecture is, of course, that multiple requestors can obtain simultaneous access to different parts of a centralized memory. It is the responsibility of the operating system software (OS) to see to it that contentions for a same memory unit (e.g., 130 or 131) are minimized.

The operating system (OS) software can be stored in a nonvolatile storage unit such as ROM (not shown) or CD-ROM (not shown) that is operatively coupled to, or forms part of, the system memory 130–131. For high speed nonvolatile storage such as ROM, the OS instructions can be executed directly from that storage. For slower-speed nonvolatile storage such as CD-ROM (compact disk), the OS instructions can be downloaded into system RAM 130–131 and executed from there.

The illustrated embodiment of the image processing and display system 100 uses a PowerPC™ 602 CPU, 110 such as made by International Business Machines (IBM) of Armonk, New York. Other CPU's may of course be used.

The PowerPC™ CPU 110 has its own processor data bus (PD) 112 and its own address/control bus (PA/C) 114. The PowerPC™ data and address/control buses, 112 and 114, couple to the memory data and memory address/control buses, 122, 123 and 124, by way of a bus interface unit 115. Signals from peripheral devices such as the interactive response mechanism 195 (e.g., the user-joystick) couple to the PowerPC™ data and address/control buses, 112 and 114, by way of the basic-I/O interface unit 105. An internal cache memory ($) is provided within the PowerPC™ chip for enabling data processing by the CPU 110 at the same time that other devices access the system memory 130–131. Cache coherency is maintained through a snooping mechanism.

CPU 110 has at least two operating modes, referred to here as 'normal mode' and 'privileged supervisory mode'. The operating system (OS) software is provided with the exclusive ability to switch the CPU 110 from one to the other of the normal and privileged supervisory modes. A control signal on the PowerPC™ address/control bus 114 indicates whether the CPU is in normal or privileged supervisory mode. The PPC bus interface unit 115 copies that signal onto memory address/control bus 124 and makes the same indication available to the triangle-engine 150 so that engine 150 can determine whether the CPU is in normal or privileged supervisory mode. Software modules that are to modify privileged-access registers within the TE should do so by way of the OS application program interface (API). In one embodiment, every access to a TE register that comes by way of the bus interface unit 115 is automatically deemed to be priveleged while every access to a TE register that comes by way the memory interface module 151 is automatically deemed to be non-priveleged.

Instructions and/or image data are loadable into the memory units 130–131 from a variety of sources (not shown), including but not limited to magnetic or optical floppy or hard disk drives, a CD-ROM drive, a silicon ROM (read-only-memory) device, a cable headend, a wireless broadcast receiver, a telephone modem, etc. Such downloads typically come by way of the basic-I/O interface unit 105.

The downloaded instructions are not necessarily for execution by the CPU 110. They may instead be directed to the triangle-engine 150 as will be seen below, or to other instruction executing components such as, but not limited to, the VPP 160 and other audiovisual data manipulating engines 148–149.

Buses 122, 123 and 124 depict in a general sense the respective data and control paths for moving instructions and image data into and out of memory units 130–131. Downloaded image data (including native and texturing data) can be in compressed or decompressed format. Compressed image data may be temporarily stored in a compressed image buffer of memory 130–131 and expanded into decompressed format either in system memory or inside the triangle-engine on an as needed basis. Immediately-displayable image data, such as that of a below-described frame buffer (FB0 140) may be maintained as a linked list of non-compressed data.

The CPU 110 sets one or more 'forced-address' registers within the VPP 160 to point to respective locations in the system-memory 130–131 that store the start of a currently active 'Video Display List' (VDL). The VDL in turn points to the currently 'active' frame-buffer. The VDL has a linked-list structure wherein the start block of a VDL can point to a second block or back to itself, the second block can point to a third block or back to itself, and so forth. A video display list (VDL) is deemed exhausted when the video post-processor (VPP) 160 has generated a software-defined number of screen lines.

After a 'valid' VDL start location is written into one of plural 'forced-address' registers in VPP 160 a DMA controller within the VPP 160 begins to periodically send requests to the corresponding MAC (120 or 121) for successive blocks of the active Video Display List (VDL) that contain image data and render control words until the VDL is exhausted. The VPP 160 stores the fetched control words and processes the fetched image data accordingly so as to generate video signals for a corresponding image 185 on the video display unit (VDU) 180.

At the same time that the video post-processor (VPP) 160 is repeatedly fetching items from the active video display list (VDL) and generating display signals of the corresponding imagery for consumption by VDU 180, the CPU 110, the triangle-engine (TE) 150 and/or the other image manipulating engines 148–149 can access binary-coded data stored within the memory 130–131 and modify the stored data within memory 130–131 at a sufficiently high-rate of speed to create an illusion for an observer 190 that real-time animation is occurring in a high-resolution image 185 (e.g., 640-by-480 pixels, 24 bits-per-pixel) then being displayed on video display unit 180.

In many instances, the observer 190 will be interacting with the animated image 185 by operating buttons or a joystick or other input means of the interactive response mechanism 195. The system user's real-time responses are fed back to the basic-I/O interface unit 105 and/or to the CPU 110 and the latter units react accordingly in real-time.

The term 'real-time' as used here means sufficiently fast (e.g., within roughly 15 to 0.3 milliseconds) so that a human user 190 perceives the corresponding changes to the audio-visual show emanating from the audio and visual output units (e.g., VDU 180) to be occurring substantially instantaneously.

The image 185 that is displayed on VDU 180 is defined in part by bitmapped data stored in one or more screen-band buffers (e.g., 140 and 141) within memory 130–131. Each screen-band buffer contains one or more scanlines of bit-mapped image data. Screen-bands can be woven together in threaded list style to define a full "screen". Alternatively, a single screen-band (a 'simple' panel) can be defined such that the one band holds the bit-mapped image of an entire screen (e.g., a full set of 240 low-resolution lines or 480 high-resolution lines).

When the triangle-engine 150 and VPP 160 are being used simultaneously, it is preferable to use double-frame buffering (or multi-frame buffering) wherein the TE renders into a first frame-buffer and the VPP reads data from a pre-rendered second frame-buffer (from the 'active' FB). The storage of the frame-buffer under-rendition and the active frame-buffer is preferably alternated between the MEM0 and MEM1 units, 130 and 131, so that while the VPP 160 is fetching the data of one frame-buffer (e.g., FB1) for display purposes from one of the MEM0 and MEM1 units, the triangle-engine 150 can be simultaneously writing new data to the other of units 130 and 131.

Multi-buffering is generally employed when animation is being displayed. The VPP 160 reads image data from a first, 'active' frame-buffer for current display while the triangle-engine 150 writes data into a later-to-be displayed, alternate frame-buffer(s). Then one of the alternate frame-buffers is made the active buffer and the previous active area is relinquished to free memory space or used as the new frame-buffer under-rendering. The purpose of this alternation scheme is to allow both of the triangle-engine 150 and VPP 160 to simultaneously access system memory without constantly getting in each other's way.

The VPP 160 should be able to fetch data in enough time so as to be able to generate a next line of display data when the next horizontal active-scan period (H-SCAN) starts.

At the same time, the triangle-engine 150 should be able to generate next-frame imagery at sufficiently a fast pace so that when frame swapping occurs (when the 'under-rendition' FB becomes the currently 'active' FB), the system user 190 will not see any image 'tearing' but will rather perceive smooth 3D object rotation or other effects occurring in real-time.

Referring to FIG. 1B, a closer, more detailed view of the triangle-engine 150 is shown together with other system components that interact with the TE 150 such as system memory 130–131 and CPU 110.

The triangle-engine 150 is comprised of a memory interface module 151 (which includes a vertex-fetch unit), a pre-walk setup module 152, an edge-walking module 153, a span-walking module 154, a texture mapping module 155 (including a texture cache), and a result blending module 156.

Modules 152, 153, 154 and 156 operate in sequential, pipelined fashion as will become apparent. The output of the texture mapping module 155 merges into the result blending module 156 roughly in coincidence with the output of the span-walking module 154.

Each of modules 151–156 has a corresponding one or more control registers 161–166. The edge-walking and span-walking modules 153 and 154 share a common set of control registers 163.

Control register 161–166 may be updated by so-called 'immediate' instructions or by 'deferred' instructions as will be detailed below. Some registers within set 161–166 are updatable only by a 'privileged' command issuer so as to prevent accidental alteration by wayward software modules.

The contents of control registers 163 are filled by the pre-walk setup module 152 when a 'short-format' mode is employed for the deferred instructions. A multiplexer is included in the triangle-engine pipeline for bypassing the pre-walk setup unit 152 when a 'long-format' mode is employed for the deferred instructions. This programmably-selectable bypass is indicated by dashed line 159. When bypass 159 is used, the data that would have been output by the pre-walk setup module 152 should be instead pre-calculated by some other means (e.g., CPU 110). This pre-calculated output data is loaded into the walkers' control registers 163 from a corresponding part of the 'long-format' deferred instructions.

System memory 130–131 contains a number of data structures which interact either directly or indirectly with the triangle-engine 150.

A first, CPU-instructing portion 142 of system memory contains instructions for execution by the system CPU 110.

A second, deferred-instructions portion 144 of system memory contains the so-called 'deferred' instructions for execution by the triangle-engine 150.

A third, under-rendition FB portion 140 of system memory contains RGB color values for the individual pixels of a frame buffer that the triangle-engine 150 is currently rendering to.

A fourth, active-FB portion 141 of system memory contains RGB color values for the individual pixels of a frame buffer that the VPP 160 is currently reading from for purposes of display.

Each pixel in an under-rendition frame-buffer 140 may have a perspective-normalized depth value ($1/w_{FB}$) associated therewith.

A 1/w buffer area 146 is set aside in the system memory 130–131 for storing data representing the $1/w_{FB}$ value of each pixel in the corresponding under-rendition FB 140.

A 'next' 1/w buffer area 147 is further set aside in the system memory 130–131 for storing data representing the $1/w_{FB}$ value of each pixel in a frame-buffer that will be next under-rendition (e.g., FB 141). When frame swapping occurs (when the under-rendition FB 140 is made the new active FB and the displayed FB 141 is made the new under-rendition buffer), the 'next' area 147 in MEM0 becomes the new storage location for 1/w values of the new frame-buffer under-rendition 141 which is now located in separate memory unit MEM1.

As shown in FIG. 1B, the current 1/w buffer 146 is preferably stored in a memory unit other than that which stores the corresponding, currently under-rendition FB 140. This is done to minimize contention between read/write accesses to the stored 1/w depth values for the under-rendition frame-buffer and the read/write accesses to the stored corresponding RGB values of the frame-buffer under-rendition 140.

System memory 130–131 further contains one or more texturing bit map areas 143, 145 that contain texture picture elements (texels) for optional blending with span-walker generated color data. A 'texel' is used to represent the coloration values of a corresponding texture plane area $\{RGB\}_t$ and it may also represent a corresponding blend factor $\{A\}_t$ for that area. The general format of a texel is thus $\{R,G,B,A\}_t$.

Texels can cover coarse areas of a texture plane (285 of FIG. 2D) or finer resolution areas. In one embodiment there are four levels of texturing resolution (LOD=level of detail), a first that covers the equivalent in x,y space of one frame-buffer pixel at a time; a second level that covers the equivalent in x,y space of four pixels (2×2) at a time; a third level that covers the equivalent in x,y space of sixteen pixels (4×4) at a time; and a fourth third level that covers the equivalent in x,y space of sixty-four pixels (8×8) at a time. Each coarser texel of the second level is derived by averaging the texture information $\{R,G,B,A\}_t$ of four corresponding texels in the finer first level. Each texel of the third level is derived by averaging the texture information $\{R,G,B,A\}_t$ of four corresponding texels in the finer second level. Each texel of the fourth level is derived by averaging the texture information $\{R,G,B,A\}_t$ of four corresponding texels in the finer third level.

As the projective-depth factor $1/w_{IP}$ of a given interior point on a triangle surface (e.g., 230 of FIG. 2C) decreases from 1.00 to 0 (hither to yonder, see FIG. 2A), the system automatically switches from the finer to the coarser levels of texturing.

With regard to the deferred-instructions portion 144 of system memory, this portion contains instruction blocks each having at least one 32-bit wide block header and an optional subsequent set of deferred instructions generally formatted as 32 bits per instruction. The number of instructions in a block vary according to an instructions-count field within the block header.

With regard to the texture bit maps 143, 145, these portions of system memory may be completely omitted if desired or encoded as one bit per texel (1BPT), two bits per texel (2 BPT), four BPT, six BPT, . . . up to 24 BPT. The 2–24 BPT code of a given texture bit map is routed into a texel-parameter lookup table (TLUT) which expands each unique coding into corresponding texture information $\{R,G,B,A\}_t$ having more bits. One format for $\{R,G,B,A\}_t$ is 8/8/8/7/1 bits for respective fields R/G/B/A/D. (The 'D' bit is used by the VPP 160 for by-the-pixel dither bypass and/or for other functions.)

A second, programmably-definable format for $\{R,G,B,A\}_t$ is 5/5/5/1/0 bits for respective fields R/G/B/A/D. In the second format, the TLUT data is packed 2-texels per 32-bit word in system memory.

A third, programmably-definable format for $\{R,G,B,A\}_t$ is 5/5/5/0/1 bits for respective fields R/G/B/A/D. The pre-TLUT texel encoding values are packed into 32-bit wide memory words as appropriate for their value (e.g., eight 4-bit wide texel encodes may be packed into a 32-bit wide memory word).

With regard to the 1/w buffer 146, the respective $1/w_{FB}$ values consume 16 bits per frame-buffer pixel (16BPP). This means that two 1/w values may be stored in each 32-bit wide memory word. The 16 BPP characteristic of the 1/w values is a departure from the 24 BPP characteristic of conventional Z-buffers. Fairly good depth resolution is still provided because the $2^{16}$ quantization steps possible for each 16-bit wide $1/w_{FB}$ value are distributed nonlinearly relative to the z axis. There are more such quantization steps for z close to zero (close to the observer plane) and fewer as one zooms out towards z=∞ (far away from the observer plane).

The frame buffer pixels may be each represented as 16 BPP or 24 BPP. When the 16 BPP format is used for the FB pixels, a 5/5/5-4/1-2 format is used wherein five of the bits define a R field, another five of the bits define a G field, four or five further bits define a B field and the remaining two or one bits define one or more of a so-called, D-bit, a vertical-subposition bit and a horizontal subposition. The latter D and subposition bits may be used by the VPP 160 for functions operating on a by-the pixel basis.

Figure 2A:
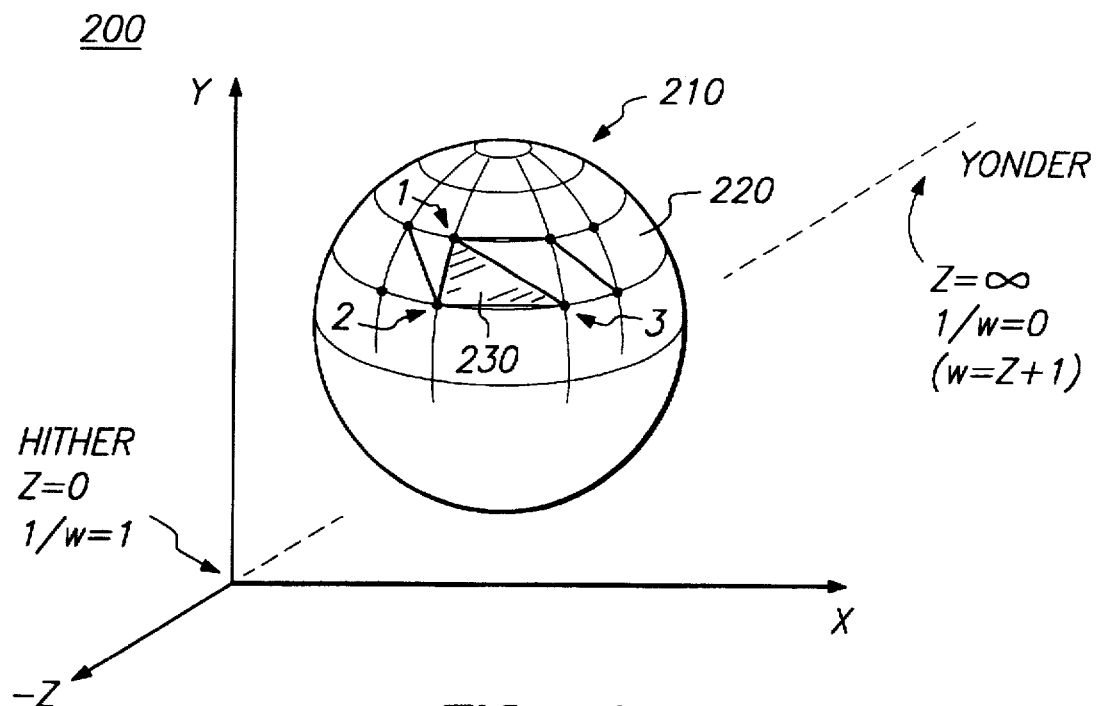
FIG. 2A is a perspective view for explaining how object-approximating 3D frameworks are formed with vertex points and how projective perspective is automatically compensated for by digital words of finite bit-width representing the value 1/w.

The coordinated operations of triangle-engine 150, of the CPU 110, and of the memory regions 140–146 are based on three-dimensional framework modeling such as shown in FIG. 2A.

Referring to FIG. 2A, a perspective view is shown of a three-dimensional coordinate system 200 having an x-axis extending horizontally, a y-axis extending vertically and a z-axis extending generally into the plane of the figure. All displayable objects are placed behind the z=0 plane. The system user 190 is understood to be situated in the negative z region facing the z=0 plane and seeing a 2-dimensional image projected onto the z=0 plane.

In the illustrated example, the three-dimensional object to be displayed is a spherical globe 210 having an outer surface 220. A pattern of sampling points are distributed about the three-dimensional object surface 220.

In the illustrated example, a regular pattern of vertex points such as 1, 2, and 3 are distributed at the intersections of regularly dispersed longitudes and latitudes.

A surface-approximating planar triangle is hypothetically drawn for every set of three neighboring sample points. In the example of FIG. 2A, sample points 1, 2, 3 define the vertex points of hypothetical triangle 230.

A linear transform between coordinate value z and a coordinate value w is defined as w=z+1. This means that as z varies from a hither point of z=0 to a yonder point of z=∞, the reciprocal value 1/w correspondingly varies from 1/w=1 (hither) to 1/w=0 (yonder).

Assume that the range 1/w=0 to 1/w=1.00 is subdivided into the $2^{16}$ equal parts. More of those parts will map to those portions of the z-axis that are closer to the hither region than those that map to portions of the z-axis closer to yonder. Finer depth resolution is therefore provided for those points that are closer to the viewer (in front of the z=0 plane) than for those points that are further away from the viewer. This concept can be otherwise understood by noting that the derivative of 1/w increases rapidly as z approaches infinity and decreases rapidly as z approaches zero.

In more generic terms, for a linear transform, w=αz+β, the reciprocal is 1/w=1/(αz+β). The reciprocal 1/w approaches zero as z approaches infinity. The reciprocal 1/w approaches the value 1/β as z approaches zero. The derivative, $d(w^{-1})/dz$ equals $-α/(αz+β)^2$ and approaches zero from the negative side as z approaches infinity, meaning that $d(w^{-1})/dz$ gets larger as z approaches infinity.

In terms of physical digital systems, this means that one may store a 16-bit wide value representing 1/w in a 16-bit memory location and obtain relatively good resolution for points near the viewer while suffering poorer depth resolution as one moves further away from the viewer along the z direction.

This type of variation in depth resolution meshes well with human vision in terms of things near and far. Human beings tend to have better depth perception for objects close by than for those far away. A form of visual realism is therefor inherently created by using a digital word of finite bit width for storing the depth factor 1/w. It resolving ability inherently mimics the ability of the human vision system to see depth perception at better resolution close up than far away.

What the human observer 190 sees depends on the optical properties of surface 220 and on surrounding lighting. The outer surface 220 of globe 210 may have any different kinds of optical properties. Surface 220 may be transparent or opaque or semi-transparent. It may be reflective or nonreflective. It may be formed of various combinations of transparent, opaque, semi-transparent, reflective portions distributed thereabout.

A beach ball made from an almost-transparent shell material would be one example of a physical item represented by globe 210. (A completely transparent shell would be invisible.) A similar beach ball having the continents of the world imprinted on its outer surface as colored opaque regions but not the oceans would be another example. In the latter case one could see the backside of the globe by looking through the almost-transparent ocean areas. A classroom globe made with an opaque shell and having both the continents and the oceans of the world painted thereon using different opaque colors would be yet another example.

Figure 2B:
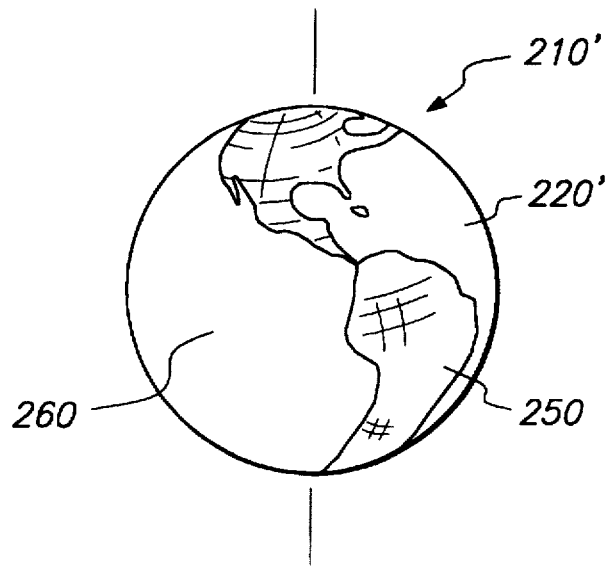
FIG. 2B is a perspective view showing a possible native coloration of the framework surface.

FIG. 2B shows an example of a globe 210' whose outer surface 220' is painted with a multi-colored opaque pattern 250 representing the land masses of the Western hemisphere. Another portion 260 of surface 220' is made semi-transparent and tinted with various shades of blue to indicate shallow and deep ocean areas. Uniform lighting is assumed.

Assume that surface-approximating triangle 230 (FIG. 2A) forms part of the semi-transparent ocean area 260 (FIG. 2B).

Figure 2C:
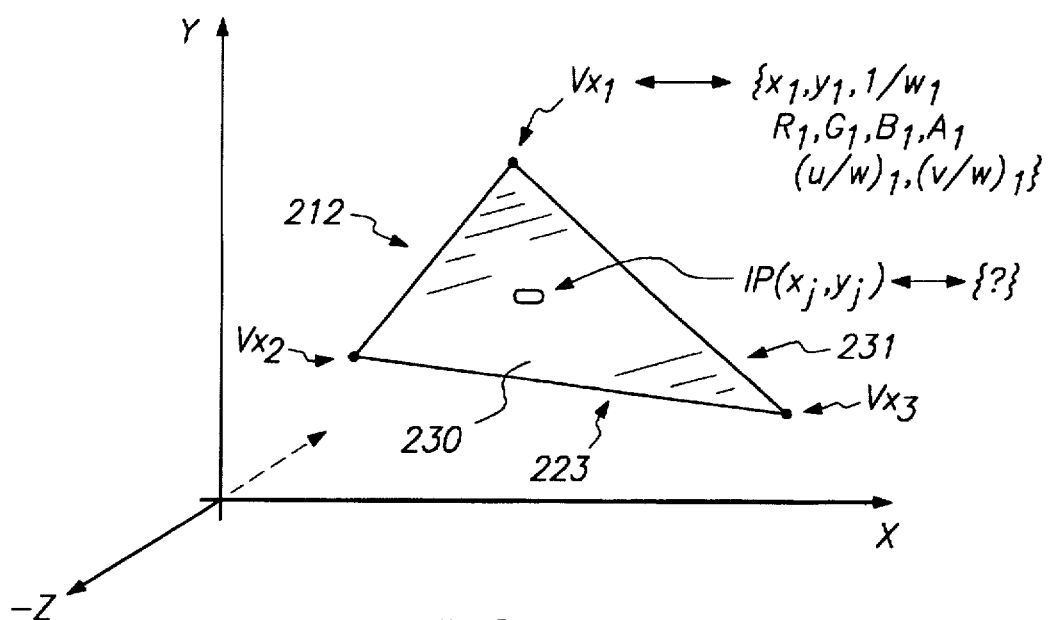
FIG. 2C is a perspective view for explaining bi-linear interpolation across the surface of a 3D triangle.

FIG. 2C is a perspective view for showing how coloration and other parameters may be defined at interior points (IP) of a triangle such as 230. Triangle 230 is first defined as nothing more than a set of three vertex points $Vx_1$, $Vx_2$ and $Vx_3$ suspended in the three-dimensional space of z>0.

A respective set of predefined parameters are attached to each of the vertex points $Vx_1$, $Vx_2$, $Vx_3$. The attached parameter set of $Vx_1$ is shown as $\{x_1, y_1, 1/w_1, R_1, G_1, B_1, A_1, (u/w)_1, (v/w)_1\}$.

Although not shown, it is understood that second vertex $Vx_2$ has a correspondingly subscripted set of parameters defining 3-dimensional location, coloration, blend and texture mapping; and that third vertex $Vx_3$ also has a correspondingly subscripted set of parameters. Digital signals are stored in memory in the form of deferred instructions (e.g., in region 144 of FIG. 1B) for representing these predefined parameters.

At this point in time there is no stored data in system memory for representing the x, y, 1/w, R, G, B, A, u/w, v/w parameters of interior points of triangle 230. The stored definition of triangle 230 by means of only the three vertex points, $Vx_1$, $Vx_2$, $Vx_3$ is fairly compact and thus system memory space is conserved.

The triangle-engine 150 fetches the so-called deferred-list containing the predefined parameters of vertex points $Vx_1$, $Vx_2$ and $Vx_3$ by sending a corresponding request to MAC1 unit 121 (FIG. 1B). Memory and bus usage time is minimized by transmitting only this minimal information set to the triangle-engine.

Upon obtaining and locally storing the information for vertex points $Vx_1$, $Vx_2$, $Vx_3$, the triangle-engine 150 next projects the vertex points onto the z=0 plane and determines which vertex point or points is highest and which point or points are lowest. One edge of the triangle having both a highest and a lowest vertex is designated as the 'long-walk' edge. Another edge of the triangle that shares the highest vertex is designated as the 'short-walk' edge. This step of distinguishing vertices and edges is referred to as vertex sorting.

The triangle-engine 150 then computes the slopes and lengths of the short/long walk edges 212 and 231.

The respective parameters of each interior point (IP) having coordinates xj, yj and lying on the surface of triangle 230 are then determined by bi-linear interpolation.

Bi-linear interpolation works as follows. Assume that each parameter (x, y, 1/w, R, G, B, A, u/w, v/w) of each interior point IP on the surface of triangle 230 is a linear function of its x and y coordinates. Using the color parameter R as an example, we can then write the linear equation {Eq. 1.0} as follows:

$$Rj(xj,yj)=a_R x+b_R y+C_R \qquad \{\text{Eq. 1.0}\}$$

We do not yet know the values of the equation constants, a, b and c. These can be solved for by noting that the same equation holds true at the three known vertex points $Vx_1$, $Vx_2$ and $Vx_3$ having respective coordinates $(x_1,y_1)$, $(x_2,y_2)$, and $(x_3,y_3)$.

Thus, the following three additional equations may be written:

$$R_1(x_1,y_1)=a_R x_1+b_R y_1+c_R \qquad \{\text{Eq. 1.1}\}$$

$$R_2(x_2,y_2)=a_R x_2+b_R y_2+c_R \qquad \{\text{Eq. 1.2}\}$$

$$R_3(x_3,y_3)=a_R x_3+b_R y_3+c_R \qquad \{\text{Eq. 1.3}\}$$

The constants $a_R$, $b_R$, and $c_R$ can now be solved using well known linear algebra techniques. This solution is carried out by the hardware of the pre-walk setup module 152 on a per triangle basis.

Note that the values $a_R$, $b_R$ and $c_R$ change with every new triangle. Accordingly, a new solution for $a_R$, $b_R$ and $C_R$ is generally needed with the fetch of each new triangle. This is one of the jobs of the pre-walk setup module 152 (FIG. 1B). The pre-walk setup module 152 can be computing the bilinear interpolation constants $a_R$, $b_R$ and $c_R$ for a second triangle while the edge-walker 153 and span-walker 154 are stepping across an earlier processed triangle.

Not only are the linear equation constants a, b, and c different for each triangle, they are different for each parameter. Accordingly, the pre-walk setup module 152 computes separate equation constants for each of the parameters and then stores them in the walker's control registers 163 in accordance with the following TABLE-1:

TABLE 1

| R | G | B | A | u/w | v/w | 1/w |
|---|---|---|---|-----|-----|-----|
| $a_R$ | $a_G$ | $a_B$ | $a_A$ | $a_u$ | $a_v$ | $a_w$ |
| $b_R$ | $b_G$ | $b_B$ | $b_A$ | $b_u$ | $b_v$ | $b_w$ |

Note that linear equation constants, $c_R$ through $c_w$, are not stored in the walker's control registers 163. There is no need for them. The parameters of vertex points $Vx_1$, $Vx_2$, $Vx_3$ inherently incorporate the equation constants, c, in their respective parameter values. The edge and span walkers 153-154 start at the vertices and then increment from there by respective deltas.

Note that the partial derivative of R with respect to x is equal to $a_R$. The partial derivative of R with respect to y is equal to $b_R$. The linear equation constant $c_R$ drops out during differentiation.

Figure 2D:
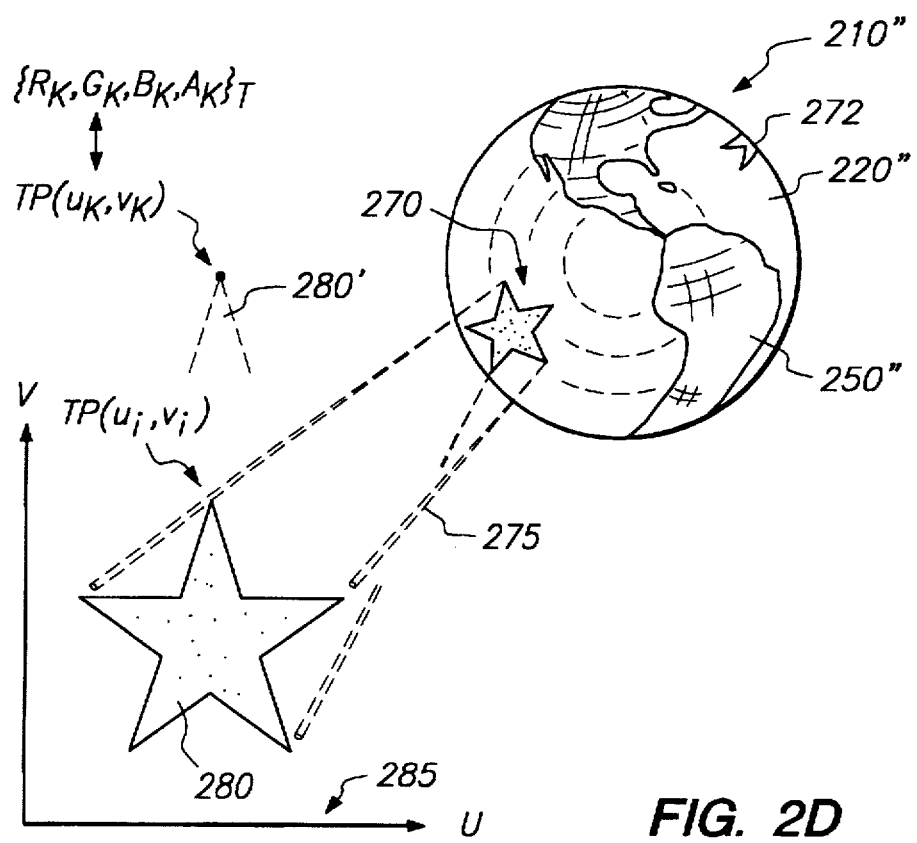
FIG. 2D is a perspective view for explaining the mapped blend-in of texture plane information onto the object surface.

Referring to FIG. 2D, it is sometimes desirable to blend in a texturing image with the native coloration of the framework triangles. For example, assume that a set of semi-transparent storm clouds are to be drawn lying over the ocean at region 270. The rendering of such additional information is referred to as texturing.

The textured image may be made to appear as if it wraps 3-dimensionally about the three-dimensional surface of the rendered native object. FIG. 2D shows an example wherein a regular five-pointed star 280 is projected onto the surface of globe 210" with rotation and perspective adjustment to thereby produce the 3-dimensionally wrapped star 270 near the horizon of globe 210".

The regularly-formed star 280 is defined on a two-dimensional plane 285 having coordinates u and v. Each texture point (TP) on plane 285 has associated therewith a respective set of coordinates, $u_i$, $v_i$ and also respective coloration and blend information, $(R_i, B_i, G_i, A_i)_T$.

The texture coloration and blend factors $\{R, G, B, A\}_T$ at a given texture point TP(u,v) is obtained by first converting the values u/w and v/w of a corresponding triangle surface point (IP) to respective u and v coordinates by dividing by 1/w. As the value of 1/w decreases towards zero, the steps taken in texture space 285 become larger and larger. The effect of these increasingly larger steps in texture space is to produce a more compressed projection onto the x-y plane during rendering.

Such a compressive effect is seen in FIG. 2D where a head portion of star 280 generates a relatively large right arm of projected star 270 while the legs of original star 280 become compressed into the smaller respective left leg and left arm of projection 270. The smaller left leg and arm portions of projection 270 are closer to the globe horizon, and the head portion of projection 270 is closer to the equatorial center, the latter being the 3D point closest to viewer 190.

The same star 280 in texture space 285 may be mapped multiple times onto surface 220". Thus, storm system 272 may be a second rendition of star 280 with its own unique set of rotations and depth values 1/w.

Any one change made in texture space 285 will be reflected to the multiple points on surface 220" that reference the changed point in texture space. Thus, if the head of star 280 is originally positioned at texture point TP($u_i$,$v_i$), and the image of the star 280 is moved upward in texture space to new position 280', all native points on surface 220" that reference the original position TP($u_i$,$v_i$) will cease to show the head point of the star and will now show whatever new texture value $\{R_i,G_i,B_i,A_i\}_T$ is moved into position TP($u_i$,$v_i$). All native points on surface 220" that point to the new position TP($u_k$,$v_k$) of the star tip will now pick up the newly-introduced texture value $\{R_k,G_k,B_k,A_k\}_T$ for blending with their native colors.

If desired, the two-dimensional cell engines 148 may be used for making real-time modifications to the $\{R,G,B\}_T$ values of texture space 285.

Referring to FIG. 3, the z=0 plane (the x-y plane) is shown mapped onto a frame-buffer space composed of frame-buffer rows and columns. The long-walk (LW) and short-walk (SW) edges from vertex $Vx_1$ are also projected onto the z=0 plane.

In FIG. 3 it is assumed that the left edge of triangle of 230 is the long-walk (LW) edge and the right edge is the short-walk (SW) edge. Edge walker 153 begins at point $Vx_1$ in the x-y plane and begins to walk down the long-walk edge 212. The edge walker 153 stops at each point along edge 212 having a y coordinate corresponding to the dead center of a crossed-over frame-buffer pixel. The edge walker 153 then compares the x position of the long-walk edge point with the x position of the dead center point of the underlying frame-buffer pixel. If the dead center of the underlying frame-buffer pixel is to the right of the long-walk line 212, (and to the left of the short-walk line 231), then the edge walker 153 designates the underlying frame-buffer pixel as being 'inside' the area of the walked triangle.

If the edge-overlapped frame-buffer pixel is 'inside' the triangle, the edge walker calculates the interior point parameters $\{x,y,R,G,B,A,u/w,v/w,1/w\}_i$ of the dead center point of the first 'inside' frame-buffer pixel and hands the calculated parameter values over to the span-walker 154 by way of walkers control register set 163.

The edge-walker 153 also calculates for the span-walker 154, the location (x and y only) of the last frame-buffer pixel that is 'inside' the triangle. The span-walker 154 then walks along the x-direction by increments equal to the center-to-center pitch of the frame-buffer pixels, and at each stop 'inside' the long and short-walk edges 212 and 231, the the span-walking module 154 calculates the corresponding, iterated parameters, $\{x,y, R,G,B,A, u/w,v/w,1/w\}_i$.

As the span walker 154 steps center-to-center, the walker 154 also calculates the texture space mapping coordinates, $u_i$ and $v_i$, from the iteratively derived values of $u/w_i$, $v/w_i$ and $1/w_i$. The texture space mapping coordinates u, v are handed off to the texture mapping module 155. The iterated coloration, blend and depth values $\{R, G, B, A, 1/w\}_i$ are handed off to the blending unit 156 as shown in FIG. 1B.

While the span walker 154 is stepping across in the x direction for a first frame buffer row, the edge walker 153 proceeds to perform the 'inside' versus 'outside' and other calculations for the next frame buffer row. The pre-walk setup module 152 is at the same time performing the set-up calculations for the next triangle and the vertex fetch unit 151 is at the same time fetching at least one new vertex Vxnew for next-processing by the pre-walk setup module 152. Thus the system is highly pipelined for efficient rendering of vector-based surface information onto a two-dimensional plane.

In FIG. 3, those frame-buffer pixels that are designated as being 'inside' the triangle are marked by interior black squares at their dead center positions. Frame-buffer pixels that are deemed to be 'outside' the walked triangle are indicated as such by unfilled circles at their respective dead center positions. If the dead center point of a given frame-buffer pixel coincides exactly with the walked edge, 212 or 231, an arbitration scheme is carried out to designate that frame-buffer pixel as being 'inside' or 'outside' without allowing for double strikes or gaps between the triangles that share that frame-buffer pixel on exactly 50%—50% basis.

Referring to FIG. 4, the task allocation between the system CPU and the triangle engine is arranged to make balanced, efficient use of both resources, 110 and 150.

As shown in portion 410 of the pipeline flow diagram 400 of FIG. 4, the CPU 110 manages the importation of data representing three-dimensional object frameworks from an image source such as a CD-ROM or the like into system memory. Alternatively, the CPU builds the data for the three-dimensional object frameworks on its own.

Next, the system CPU 110 accesses the memory location where the imported object definitions are stored and transforms them three-dimensionally as desired to scale the size of the object, to rotate it, to translate it, to distort it, etc.

The CPU 110 is also responsible for clipping away from the framework any vertex points which fall outside of the display scene.

The CPU 110 is further responsible for defining various lighting conditions. This can be done by modifying the native color values of each vertex point $\{R,G,B\}_{Vx}$ of each surface native point or changing its blend factor $\{A\}_{Vx}$. This may also be done by appropriate mapping of texture values to the sample points (vertices) of the 3D object surface 220 and varying the blend factor $\{A\}_T$ of the texturing coloration $\{R,G,B\}_T$.

The CPU 110 may also be given the task of locating surfaces that are totally covered by other opaquely-colored surfaces and of removing the vertex-based frameworks of those hidden surfaces to lessen the workload of the triangle engine.

The CPU 110 then constructs vertex-based draw lists in the form of the deferred instruction lists which are stored in region 144 of system memory.

Once a sufficiently-long list of deferred instructions has been developed for processing by the triangle engine 150, the CPU 110 sends an 'immediate' flow-control instruction to the triangle engine to set the triangle to work on the constructed list of deferred instructions area 144. The pipelined processing of information then passes to the triangle engine as indicated by flow line 415.

On occasion, the triangle engine 150 may run into an exception situation which requires intervention by the CPU 110. Such request for intervention is indicated by dashed flow line 455. The CPU responds accordingly with appropriate 'immediate' instructions.

Referring to box 450 of FIG. 4, once the triangle engine is set to work on a given worklist (see FIG. 7), the triangle engine 150 begins to periodically fetch from memory region 144 successive 'valid' portions of the worklist.

The worklist generally starts the triangle engine with an initial task of building a so-called 'new' triangle having three newly-defined vertices. Strip and fan formations may be developed from the 'new' triangle by replacing one of the previous three vertices with a new vertex and then computing the parameters of the new triangle that includes the substituted vertex.

With each set of three vertices, the pre-walk setup module 155 sorts the vertices as explained above. The symbol "(*)" in FIG. 4 indicates that this function may be bypassed through bypass path 159 and performed instead by the CPU or another means.

As box 450 further shows, the pre-walk setup module 152 of the triangle engine further computes various gradients for the walkers along the triangle edges and from pixel-center to pixel-center of each frame buffer row.

The edge walker 153 walks along the triangle edges. The span walker 154 walks across frame buffer rows. As span walker 154 stops at the dead-center of each respective frame buffer pixel, the walker 154 computes the iterated values $u_i$, $v_i$ and sends corresponding signals to texture mapper 155.

Texture mapper 155 fetches the requested texture data from its local cache. System software is responsible for seeing to it that the appropriate texture data is pre-loaded into the texture cache from a corresponding one of maps 143 and 145 in system memory. (Each triangle that is mapped onto the z=0 plane (the x-y plane) has a counterpart triangle mapped onto texture space 285 (onto the u-v plane). System software can predict from known vetex coordinates what portion of the texture plane 285 will be covered while a given triangle is spanned in x-y space, and the system software can thus pre-load that data into the texture cache.)

The texture mapper 155 includes the TLUT (texture lookup table) which converts the encoded texel data into full texture information $\{R,G,B,A\}_T$.

The blender module 156 blends the respective, various parameter signals as output $\{R,G,B,A,1/w\}_i$ by the span walker 154; as output $\{R,G,B,A\}_T$ by the texture mapper 155; and as originally found $\{R,G,B,1/w\}_{FB}$ in the frame buffer under-rendition 140 and corresponding 1/w buffer 146; and blends these parameter signals together to produce a new frame buffer coloration signal, $FB'=f(C_i, A_i, C_T, A_T, C_D)$ which is a function of the input signals, where $C_i$ represents $\{R, G, B\}_i$, $C_T$ represents $\{R, G, B\}_T$ and $C_D$ represents the original frame-buffer coloration information $\{R, G, B\}_{FB}$ before the new value is written into the destination.

After blending, the iterated depth factor $1/w_i$ is tested against the original frame buffer value $1/w_{FB}$ stored in buffer 146. If the test result proves true, the new coloration is written into the corresponding frame buffer location and the new $1/w_i$ value, if prevailing, is written into the corresponding location in depth buffer 146. If the test result is false, then no writing takes place. The depth test function is programmably defined to include the relationships: less than (<), less than or equal to ($\leq$), equal to (=), greater than or equal to ($\geq$), or greater than (>) as between $1/w_i$ and $1/w_{FB}$. The desired test type is written by CPU 110 into the blend control registers 166.

Figure 5:
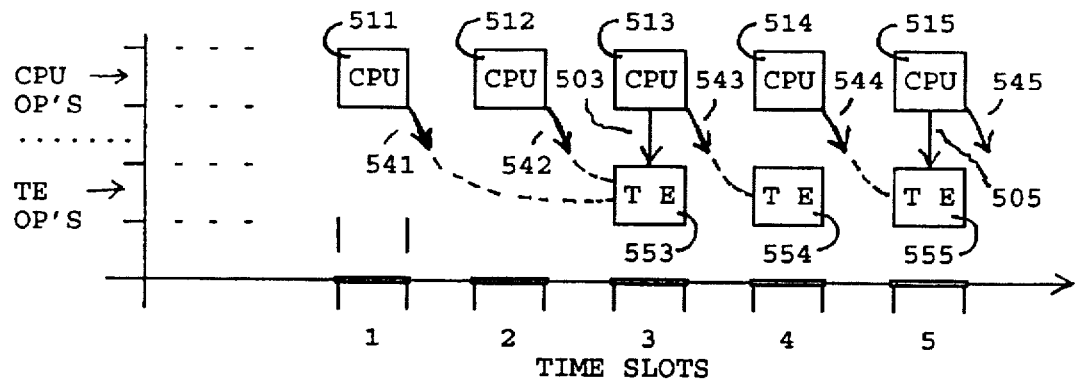
FIG. 5 is a timing diagram showing pipelined generation of deferred instructions and later execution of same by the triangle engine.

Referring to FIG. 5, time graph 500 illustrates the overlapped pipeline operations of the CPU 110 and the triangle engine 150 in respective time slots 1, 2, 3, etc. Time-bounded operations of the CPU are respectively represented by boxes 511, 512, 513, 514, 515 for respective time slots 1–5. Time-bounded operations of the triangle engine are similarly represented by boxes 553, 554, 555 for respective time slots 3–5.

The creation of a deferred instruction list is represented by diagonal flow lines coming off of the CPU boxes such as lines 541, 542, 543, 544 and 545. Immediate instructions sent from the CPU to the TE are represented by vertical downlines such as 503 and 505.

Before the triangle engine 150 begins operations on a given worklist, the CPU may spend any number of time slots to generate the deferred instructions of that worklist as indicated by work flowlines 541 and 542.

At time slot 3 of the illustrated example, the CPU sends an immediate instruction 503 to the triangle engine to begin consuming a worklist having a pre-defined set of deferred instructions. The triangle engine begins to do so and at the same time the CPU may continue to generate more deferred instructions as indicated by work flowline 543. These newer instructions 543 may be picked up by the triangle engine 554 in time slot 4. Similarly in time slot 5, the CPU may send additional immediate instructions 505 to the triangle engine in combination with previously-formed deferred instructions 544. The input to the triangle engine may thus be a combination of both immediate and deferred instructions. The input to the triangle-engine 150 is not limited by the output bandwidth of the CPU 110.

Figure 6:
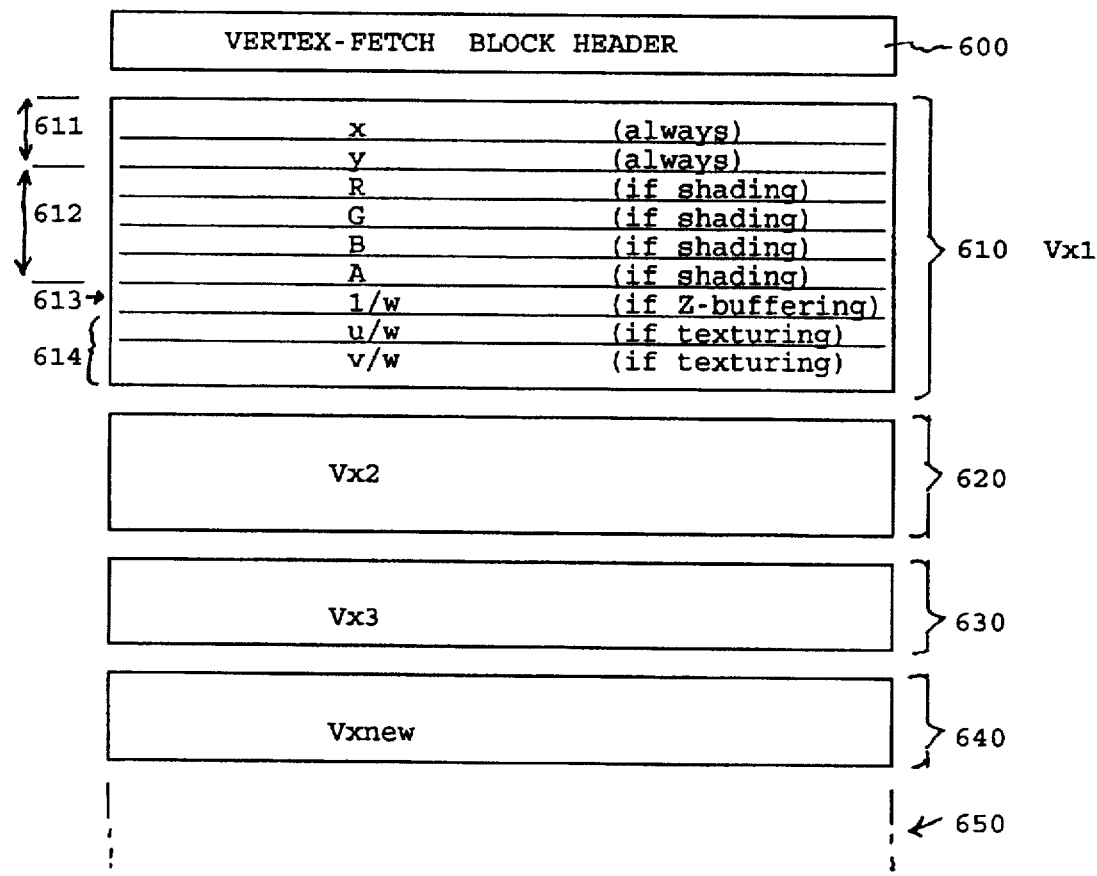
FIG. 6 shows the data structure of a group of short-format vertex instruction blocks and a corresponding block-defining header.

FIG. 6 shows a data structure that may be used in system memory region 144 to define a block of 'instructions' 610, 620, 630, 640, 650, etc. The listed instructions may be used for causing the triangle engine 150 to render one or more triangles, one or more 'points' or one or more other structures into the under-rendition FB 140.

The specific format of the instructions block is defined by a block header 600. The block header 600 includes a first field indicating how many instructions are included within its corresponding block. The block header 600 further includes a second field indicating the format of each instruction within its corresponding block. The instructions count and format may change on a block by block basis.

In the example of FIG. 6, it is assumed that the block header 600 has specified a collection of short-format vertex instructions for its corresponding block. The data structure for defining a first short-format vertex instruction is shown at 610. The size of instruction 610 will vary depending on which master functions are turned on or off within the triangle engine and which local functions are turned on or off within the block header 600.

Location-specifying words 611 for x and y coordinates are always present in a vertex instruction and are each 32 bits wide. Shading words 612 for RGBA are present only if shading is turned on. The reciprocal Z-buffering word 613 is present either if Z testing and buffering is turned on, or if texturing is turned on. (The texturing process needs 1/w in order to compute u and v from u/w and v/w.) The texture mapping words 614 for u/w and v/w are present only if texturing is turned on. Control fields within the block header 600 indicate whether for the local block, shading is turned on, Z-buffering is turned on and/or texturing is turned on.

The remaining instructions 620, 630, etc., under block header 600 all have the same size and format as first instruction 610.

Vertex instruction 620 contains the information for vertex Vx$_2$. Vertex instruction 630 contains the information for vertex Vx$_3$.

Vertex instruction 640 contains the information for a next vertex, in this example, Vx$_{new}$. When a 'new' field is set true in the block header 600, the new vertex Vx$_{new}$ defines a substitute for one of previous vertices defined as oldest and medium. Replacement of oldest or medium is selected depending on whether strip or fan formation is turned on within the block header 600. When strip or fan formation is turned on, next triangles are specified with the addition of just one new vertex. Accordingly, a chain of many triangles each joined to the other by a common edge may be specified in a fairly compact manner that after the overhead of the block header and the first triangle in the chain, requires no more than one vertex instruction per triangle.

The block header for vertex instructions is 32-bits wide and has the format as set forth in TABLE-2:

TABLE 2

| Field | No. of Bits | Description |
|---|---|---|
| ID | 4 | Instruction identification code = vertex instruction. |
| VER | 4 | Hardware version number needed by the hardware platform to support this instruction block. |
| CNT | 16 | Instructions count. Indicates how many vertex instructions follow this header (1–65,536) |
| SHADE | 1 | 0 = no shading information present in below vertex instructions, 1 = shading information is present. |
| PRSP | 1 | "1" = 1/w inforrttation is present in below groups, "0" = no perspective information is present. |
| TEXT | 1 | "1" = texture information is present in below vertex instructions; "0" = no texture information is present. |
| NEW | 1 | = the first three vertices define a new triangle for starting a strip or fan chain or for defining the triangle by itself. "0" = this is a continuation of a previous strip or fan chain. (This field is used only for short-format vertex instructions. When active, the new field causes all TE processing to halt until three new vertices have been in-loaded. |
| RM | 1 | Replace mode. Vxnew replaces the following: "0" = replace oldest (strip generation), "1" = replace medium (fan generation). |
| — | 3 | Reserved. |

One encoding of the instruction ID field indicates that short-format vertex instructions will be used such as shown in FIG. 6. Another encoding indicates that a so-called long-format will be used. The long format instruction activates bypass 159 so that the operations of the pre-walk setup module 152 are bypassed and the required information from that bypassed unit is instead provided by another source. The information in a long-format vertex instruction is as follows:

TABLE 3

| Information | Format | Outputs (Vertex) Inputs (Edge) |
|---|---|---|
| X-Coordinates | 12.0 | X1, X2 |
| Y-Coordinates | 12.0 | Y1, Y2, Y3 |
| Spatial Slopes | s12.0 | xstep_long |
| | | xstep_0 |
| | | xstep_1 |
| Characteristic Function Gradients | s12.0 | xystep_long |
| | | xystep_0 |
| | | xystep_1 |
| Characteristic Function Slopes | s12.0 | dy_long |
| | | dy_0 |
| | | dy_1 |
| Colors | 9.0 | R1, G1, B1 |
| Color Slopes | s9.11 | slope_r |
| | | slope_g |
| | | slope_b |

TABLE 3-continued

| Information | Format | Outputs (Vertex) Inputs (Edge) |
|---|---|---|
| | | dDx_r |
| | | dDx_g |
| | | dDx_b |
| Alpha | 9.0 | A1 |
| Alpha Slopes | s9.11 | slope_a |
| | | dDx_a |
| Textures (u/w, v/w) | 11.13 | uW1, vW1 |
| Depth (1/w) | 1.23 | W1 |
| Texture Slopes | s11.13 | slope_uW |
| | | slope_vW |
| | | dDx_uW |
| | | dDx_vW |
| Depth Slopes | s1.23 | slope_W |
| | | dDx_W |
| Scan Direction (Area) | s23.0 | R2L |

In a third encoding of the vertex instruction ID field, each vertex instruction may be used for coloring a single framebuffer pixel rather than an area covered by a triangle. In such a case each vertex instruction has the following format:

TABLE 4

| Information | Format | Outputs (Vertex) Inputs (Edge) |
|---|---|---|
| X-Coordinate | 12.0 | X |
| Y-Coordinate | 12.0 | Y |
| Colors | 9.0 | R1, G1, B1 |
| Alpha | 9.0 | A1 |
| Texture Depth | 1.23 | 1/W1 |

Figure 7:
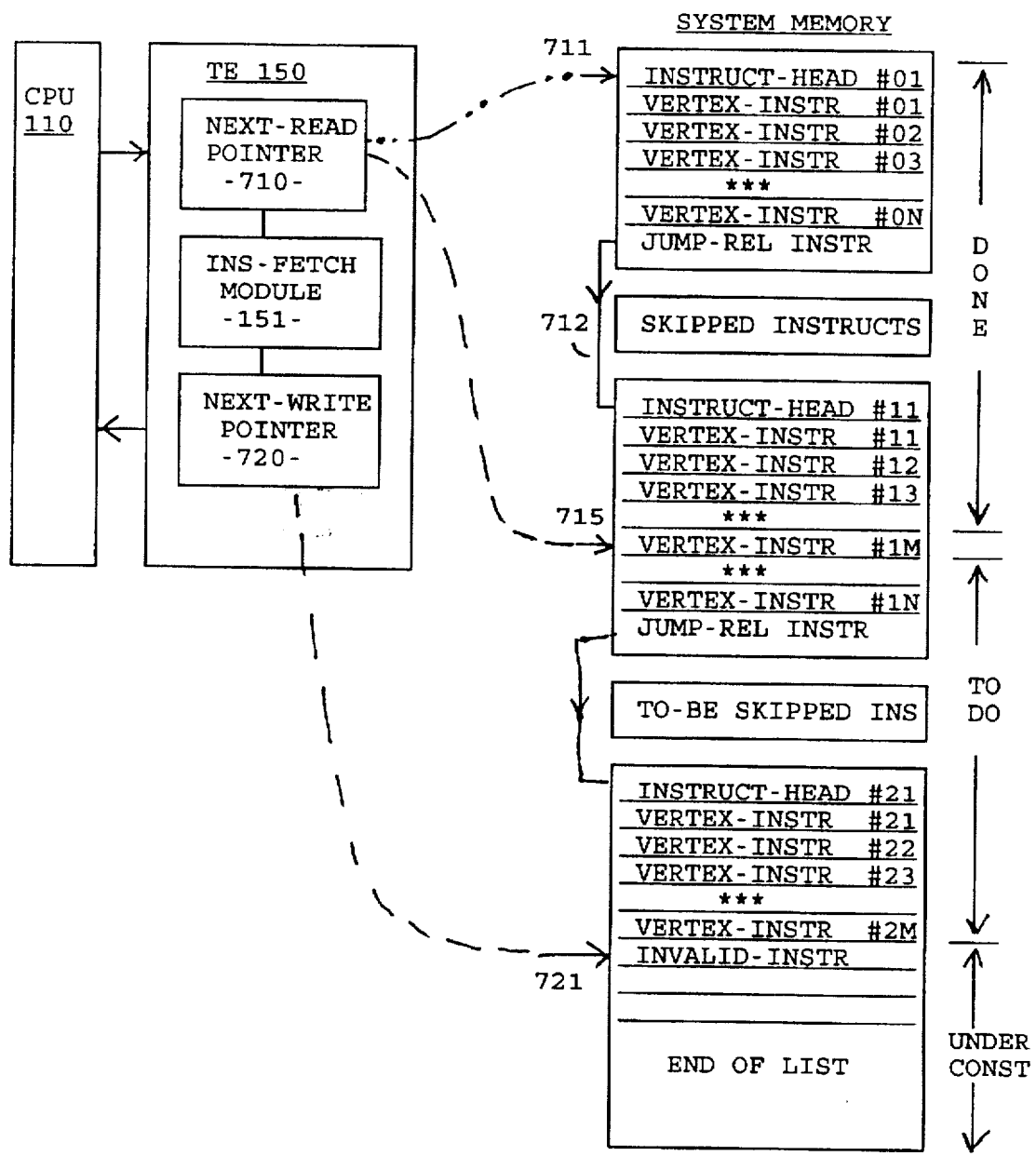
FIG. 7 illustrates how a deferred instructions list is constructed at a tail end while a higher up portion is simultaneously executed by the triangle-engine.

Referring to FIG. 7, the triangle engine 150 includes a next-read pointer register 710 and a next-write pointer register 720.

The contents of the next-read pointer register 710 point to the location 715 in system memory containing the instruction to be now executed by the triangle engine 150. After the instruction fetch unit 151 has fetched this instruction, it normally increments the next-read pointer register 710 to the next sequential instruction in memory, unless otherwise commanded.

One way that the instruction fetch unit 151 can be otherwise commanded is if the most recent instruction is a flow-control instruction telling the fetch unit 151 to instead add a relative jump value to the value currently in the next-read pointer register 710. A relative jump around skipped instructions is indicated for example at 712.

Another way that the normal fetch sequence of instructions is altered is when the CPU supplies an immediate command for changing instruction flow.

The next-write pointer register 720 points to a location 721 in the deferred instructions area 144 of system memory where a next instruction may be inserted and thus appended onto the currently active worklist. (Region 144 can store more than one worklist.)

The next-read pointer 710 sweeps down from the top of the active TE worklist (from initial position 711) towards the position 721 of the next-write pointer 720. If the next-read pointer 710 advances so quickly that it bumps into the location 721 pointed to by the next-write pointer 720, the triangle engine 150 takes this to mean that it has exhausted its worklist. The triangle-engine then stops and sends an interrupt to the CPU 110.

An already-done portion (DONE) of the worklist is defined by the sweep of the next-read pointer from initial position 711 to current position 715. The still to-be-done portion (TO DO) of the instruction list continues from beyond pointer 715 to just before the position pointed to by pointer 721. The under-construction portion of the list is defined as beginning at the location 721 pointed to by pointer register 720 and continuing down to the end of the list area.

The next-read pointer register 710 and next-write pointer register 720 are part of the fetch control register set 161 shown in FIG. 1B. A description will now be provided of these and other triangle engine control registers. The following convention is used to describe the accessibility of registers within the triangle engine 150:

TABLE 5

| Mode | Description |
|---|---|
| R | The register/bit can be read as part of the address space of system memory. |
| W | The register/bit can be written to directly as part of the address space of system memory. |
| S | The register/bit supports a bit-masked set operation. |
| C | The register/bit supports a bit-masked clear operation |
| § | The register/bit may only be accessed (read/write) by a privileged supervisor (e.g. by a command signal coming by way of the PPC bus interface 115 from the CPU only and not by a deferred instruction fetched by way of the memory interface unit 151). |
| NA | Register/bits not available. |

Set and clear masks are provided so that individual bits may be set or reset without changing other fields within a given register.

Read/write access to certain registers is privileged as indicated by the '§' symbol. The contents of a § privileged register or field can only be read or modified by a privileged command signal coming from a privileged unit such as the CPU (e.g. and optionally further constrained to the condition of when the CPU is in privileged supervisor mode) and not by a non-privileged access request such as might come from a deferred instructions list by way of memory interface module 151. If a non-privileged access attempt is made to a priveleged register, an access violation interrupt is automatically generated by the TE 150.

The following first set of registers defines a so-called master control set which applies to the basic function blocks of the triangle engine:

TABLE 6

| Register Name | Field Name | Bits | Access | Description |
|---|---|---|---|---|
| TE MasterMode | | 32 | § RWSC | |
| | DShade | 1 | § RWSC | Disable shading |
| | DZBuff | 1 | § RWSC | Disable Z buffering |
| | DText | 1 | § RWSC | Disable texturing |
| | DBlend | 1 | § RWSC | Disable destination blender |
| | DDith | 1 | § RWSC | Disable dithering |
| | RSET | 1 | § RWSC | Reset the entire Triangle Engine |
| | — | 26 | N/A | reserved |

Note that each field of the TE MasterMode register is modifiable only by a privileged command giver (e.g., the CPU), meaning that wayward software or a bad deferred instructions list is unlikely to modify these master registers.

When shading is disabled, the edge-walker and span-walker bypass the step of generating iterated color values. The pre-walk setup module 152 bypasses the step of solving for the linear equation constants for the shading values.

When Z-buffering is disabled, the setup module 152, edge walker 153 and span walker 154 bypass the steps necessary for interpolating across the 1/w values of a given triangle.

When texturing is disabled, the setup module 152, edge walker 153, span walker 154 bypass the steps necessary for generating the texture map coordinates, U,V. The texture mapper 155 also bypasses the step of fetching texture data from memory.

When destination blending is disabled, the blender module 156 bypasses the step of fetching the old values from the frame buffer under rendition. In other words, the blender does not fetch $(R,G,B,1/w)_{FB}$ from memory as shown in FIG. 1B.

TABLE 7

| Register Name | Field Name | Bits | Access | Description |
|---|---|---|---|---|
| TE_I_Cntl | | 32 | § RWSC | Immediate flow-control instruction register |
| | STRT | 1 | § RWSC | Start triangle engine execution at the deferred instruction address specified in the below TE_I_Cntl Data register |
| | STPI | 1 | § RWSC | Stop execution after current instruction |
| | STPL | 1 | § RWSC | Stop execution at end of current instruction list |
| | RSTRT | 1 | § RWSC | Restart execution from stop point |
| | STEP | 1 | § RWSC | Single step - execute next instruction and then flush the TE pipeline |
| | INT | 1 | § RWSC | Interrupt CPU after completion of current instruction |
| | — | 26 | N/A | reserved |

TABLE 8

| Register Name | Bits | Access | Description |
|---|---|---|---|
| TE_I_Cntl_Data | 32 | RW | Contains data referenced by instructions generated by the TE_I_Cntl flow control register |

TABLE 9

| Register Name | Field Name | Bits | Access | Description |
|---|---|---|---|---|
| TE_D_Cntl | | 32 | § RWSC | Deferred instructions flow control register |
| | JR | 1 | § RWSC | Jump relative - use TEDCntlData as a 2's complement off set |
| | JA | 1 | § RWSC | Jump absolute - use the TEDCntrlData as destination address |
| | PSE | 1 | § RWSC | Pause execution |
| | INT | 1 | § RWSC | Interrupt the CPU and use contents of TEDCntlData as the vector data for the interrupt |
| | SYNC | 1 | § RWSC | Pause instruction execution until TE pipeline has been flushed |
| | TLD | 1 | § RWSC | Load new texture data into texture cache |
| | — | 26 | N/A | reserved |

TABLE 10

| Register Name | Bits | Access | Description |
|---|---|---|---|
| TEDCntlData | 32 | RW | Data referenced by TEDCnt register |

TABLE 11

| Register Name | Bits | Access | Description |
|---|---|---|---|
| IRP | 32 | SR | Read pointer register which points to instruction currently being executed by triangle engine |

TABLE 12

| Register Name | Bits | Access | Description |
|---|---|---|---|
| IWP | 32 | § RW | Instruction write pointer points to the first empty memory location beyond the end of list |

TABLE 13

| Register Name | Field Name | Bits | Access | Description |
|---|---|---|---|---|
| IntEn | | 32 | § RWSC | Interrupt enable word |
| | ImIntEn | 1 | § RWSC | Immediate Interrupt Enable |
| | FBClipIntEn | 1 | § RWSC | Pixels were discarded due to frame buffer clipping |
| | ALUStatIntEn | 1 | § RWSC | Check for >, =, and < |
| | ZFuncStatIntEn | 1 | § RWSC | Result of Z buffering |
| | AnyRendIntEn | 1 | § RWSC | At least 1 pixel was rendered |
| | SuperIntEn | 1 | § RWSC | Supervisor error interrupt |
| | UiInstrIntEn | 1 | § RWSC | Un-implemented instruction interrupt enable |
| | SpInstrIntEn | 1 | § RWSC | Special instruction interrupt enable |
| | — | 14 | | reserved |

TABLE 14

| Register Name | Field Name | Bits | Access | Description |
|---|---|---|---|---|
| IntStat | | | § RWSC | Triangle engine interrupt status word |
| | ImInt | 1 | § RWSC | Immediate interrupt |
| | FBClipInt | 1 | § R | Pixels were discarded due to frame buffer clipping |
| | ALUStatInt | 1 | § R | Check for >, =, and < |
| | ZFuncStatInt | 1 | § R | Result of Z buffering |
| | AnyRendInt | 1 | § R | At least 1 pixel was rendered |
| | SuperInt | 1 | § RWC | Supervisor error interrupt |
| | UiInstrInt | 1 | § RWC | Un-implemented instruction interrupt status |
| | SpInstrInt | 1 | § RWC | Special instruction interrupt status |
| | WinClipInt | 1 | § R | Pixels were discarded due to window |

TABLE 14-continued

| Register Name | Field Name | Bits | Access | Description |
|---|---|---|---|---|
| | ListEndInt | 1 | § RWC | clipping IRP = IWP (End of worklist has been hit.) |
| | ImInstrInt | 1 | § RWC | Immediate instruction interrupt status |
| | DfInstrInt | 1 | § RWC | Deferred instruction interrupt status |
| | DfInstrIntVect | 8 | § RWC | Deferred instruction interrupt vector |
| | — | 12 | | reserved |

TABLE 15

| Register Name | Field Name | Bits | Access | Description |
|---|---|---|---|---|
| Vertex Control | | 32 | § RWSC | |
| | VtxSnoopEn | 1 | § RWSC | Vertex snoop enable |
| | — | 31 | N/A | reserved |

The following table describes the registers within the setup control register set 162 of FIG. 1B. Each of the setup registers contains a floating point value having one sign bit, seven exponent bits and 24 mantissa bits.

TABLE 16

| Register | Access | Description |
|---|---|---|
| a_x | § RW | x coordinate of Vertex A |
| a_y | § RW | y - VxA |
| a_r | § RW | R - VxA |
| a_g | § RW | G - VxA |
| a_b | § RW | B - VxA |
| a_a | § RW | A - VxA |
| a_W | § RW | 1/w - VxA |
| a_uW | § RW | u/w - VxA |
| a_vW | § RW | v/w - VxA |
| iv1-7 | § RW | seven registers for intermediate variables 1-7 |
| b_x | § RW | x - VXB |
| | § RW | y - VXB |
| b_r | § RW | R - VXB |
| b_g | § RW | G - VXB |
| b_b | § RW | B - VXB |
| b_a | § RW | A - VXB |
| b_W | § RW | 1/w - VXB |
| b_uW | § RW | u/w - VXB |
| b_vW | § RW | v/w - VXB |
| iv8-14 | § RW | intermediate variables 8-14 |
| c_x | § RW | x - VXC |
| c_y | § RW | y - VXC |
| c_r | § RW | R - VXC |
| c_g | § RW | G - VXC |
| c_b | § RW | B - VXC |
| c_a | § RW | A - VxC |
| c_W | § RW | 1/w - VxC |
| c_uW | § RW | u/w - VxC |
| c_vW | § RW | v/w - VxC |
| iv15-21 | § RW | intermediate variables 15-21 |

TABLE 17

| Register Name | Field Name | Bits | Access | Description |
|---|---|---|---|---|
| Vertex State | | 32 | § RW | Triangle engine interrupt status word |
| | VCNT | 2 | § RW | Number of valid vertices |
| | TSORT | 3 | § RW | Order of incoming vertices, which is old, which is middle and which is new for vertices A, B, C |
| | — | 27 | | reserved |

The walkers control register set 163 includes the following specified registers.

TABLE 18

| Register Name | Field Name | Bits | Access | Description |
|---|---|---|---|---|
| ES_Cntl | | 32 | § RWSC | Edge and span walkers control |
| | PRSPOff | 1 | § RWSC | Perspective calculations off |
| | DUSCan | 1 | § RWSC | Down/Up Scan direction flag |
| | DSPOff | 1 | § RWSC | Disables double strike prevention |
| | reserved | 29 | N/A | |

TABLE 18a

| Register Name | Field Name | Bits | Access | Description |
|---|---|---|---|---|
| EScapAddr | | 32 | § RW | Address for edge-walker buffer capture |
| | EscapAddr | 6 | § RW | Provides access to the following internal registers of the edge-walker |
| | reserved | 26 | N/A | |

TABLE 19

| Edge Walker Buffer | Access | Description |
|---|---|---|
| X1 | § R | |
| Y1 | § R | |
| R1 | § R | |
| G1 | § R | |
| B1 | § R | |
| A1 | § R | |
| W1 | § R | |
| uW1 | § R | |
| vW1 | § R | |
| X2 | § R | |
| Y2 | § R | |
| Y3 | § R | |
| xstep_0 | § R | |
| xstep_1 | § R | |
| xstep long | § R | |
| xystep_0 | § R | |
| xystep_1 | § R | |
| xystep_long | § R | |
| dy_0 | § R | |
| dy_1 | § R | |
| dy_long | § R | |
| dDx_r | § R | |
| dDx_g | § R | |
| dDx_b | § R | |

TABLE 19-continued

| Edge Walker Buffer | Access | Description |
|---|---|---|
| dDx_a | § R | |
| dDx_W | § R | |
| dDx_uW | § R | |
| dDx_vW | § R | |
| slope_r | § R | |
| slope_g | § R | |
| slope_b | § R | |
| slope_a | § R | |
| slope_W | § R | |
| slope_uW | § R | |
| slope_vW | § R | |
| R2L | § R | |

The blender unit 156 is subdivided into two successive modules: a texture blender, followed by a destination blender. Texture blending creates a combination of the iterated values $\{R,G,B,A\}_i$ and the corresponding texture components $\{R,G,B,A\}_T$. This blended value is then blended with the frame buffer value in the destination blender portion of blender module 156. The following 32-bit wide registers in system memory address space are for use with the texture-blending portion of module 156.

TABLE 20

| Register Name | Access | Description |
|---|---|---|
| PIP | § RW | PIP RAM |
| TXTCntl | § RWSC | Texture Mapper master control register |
| TxtLdCntl | § RWSC | Texture loader control register |
| TxtAddrCntl | § RWSC | Address Generation Control Register/Filter modes |
| TxtPIPCntl | § RWSC | PIP control register |
| TxtTABCntl | § RWSC | Texture Application Control Register |
| TxtLODBase0 | § RW | LOD 0 Base Address |
| TxtLdDstBase | § RW | Texture load destination base |
| TxtMMDestBase | § RW | MMDMA Destination Base |
| TxtLODBase1 | § RW | LOD 1 Base Address |
| TxtLODBase2 | § RW | LOD 2 Base Address |
| TxtLODBase3 | § RW | LOD 3 Base Address |
| TxtLdSrcAddr | § RW | Texture decompressor source register |
| TxtMMSrcBase | § RW | MMDMA source base |
| TxtByteCnt | § RW | Byte Count for MMDMA |
| TxtRowCnt | § RW | Row count for uncompressed texture load |
| TxtTexCnt | § RW | Texel Count for compressed texture load |
| Uvmax | § RW | Texture Size Register |
| Uvmask | § RW | Texture Mask Register |
| TxtSRCType01 | § RWSC | Source Description Registers - Type 0 and 1 |
| TxtSRCType23 | § RWSC | Source Description Registers - Type 2 and 3 |
| TxtExpType | § RWSC | Expanded Type Description Register |
| TxtSRCConst0 | § RW | Source Expansion Constant Register - Type 0 |
| TxtCLRConst | § RW | MMD Clear Constant Register |
| TxtCATConst0 | § RW | PIP Constant color – SSB = 0 |
| TxtSRCConst1 | § RW | Source Expansion Constant Register - Type 1 |
| TxtPIPConst1 | § RW | PIP Constant color – SSB = 1 |
| TxtSRCConst2 | § RW | Source Expansion Constant Register - Type 2 |
| TxtCATIConst0 | § RW | Texture Application Constant color – SSB = 0 |
| TxtSRCConst3 | § RW | Source Expansion Constant Register - Type 3 |
| TxtCATIConst1 | § RW | Texture Application Constant color – SSB = 1 |

TABLE 20-continued

| Register Name | Access | Description |
|---|---|---|
| TxtSRCExp | § RWSC | Source Expansion Control Registers - Types 0, 1, 2 and 3 |

The following are registers used by the destination blender:

TABLE 21

| Register Name | Access | Description |
|---|---|---|
| Snoop | § RWSC | Snoop control for Dest Blender |
| IOCntl | § RWSC | Destination Blend I Control |
| DitherMatA | § RWSC | First half of 4 × 4 × 4 dither matrix |
| DitherMatB | § RWSC | Second half of 4 × 4 × 4 dither matrix |
| FBClipEn | § RWSC | Enable clipping to frame buffer - this should be on by default |
| FBClip | § RWSC | X and Y frame buffer clip values |
| WinClipEn | § RWSC | Enable X/Y Clipping (inside or outside clip region) |
| XWinClip | § RW | X window clip values |
| YWinClip | § RW | Y window clip values |
| WrCntl | § RWSC | Write Control register |
| reserved | N/A | |
| Wr32Bpp | § RWSC | Wr pixel format (16 or 32 bpp) |
| WrOutEn | § RWSC | Master control for component output (turned off for Z rendering or test rendering) |
| WrBaseaddr | § RW | Write base pointer |
| WrxStride | § RW | x Stride value - Distance in words to next line |
| SrCntl | § RWSC | Read Control register |
| SrcBaseAddr | § RW | Read base pointer |
| SrCXStride | § RW | Stride value - Distance in words to next line |
| SrcOffset | § RW | X and Y Offset used for reads |
| ZCntl | § RWSC | Z Buffer Control register |
| ZBaseAddr | § RW | Z Base address - NO double buffered plus stereo!! |
| ZXYOffset | § RW | X and Y Offset used for Z. Offset calc is performed before clipping |
| ZClip | § RW | Max clip values used for Z window |
| SSBDSBCntl | § RWSC | SSB & DSB (D-bit) Control register |
| RGBCntl | § RWSC | per component enable for output (otherwise recycle old value) |
| ConstIn | § RW | Const used for computation input |
| TxtMultCntl | § RWSC | Texture color multiplication control |
| DmTxtConst0 | § RW | Coef consts "0" |
| DmTxtConst1 | § RW | Coef consts "1" |
| SRCMultCntl | § RWSC | Texture color multiplication control |
| DmSrcConst0 | § RW | Coef consts "0" |
| DmSrcConst1 | § RW | Coef consts "1" |
| ALUCntl | § RWSC | ALU Control register |
| SrcAlphaCntl | § RWSC | Control of source alpha |
| DesAlphaCntl | § RWSC | Control of destination alpha |
| DesAlphaConst | § RW | Destination Alpha constants |
| Status | § R | Status indication word |
| IntCntl | § RWSC | Mask indicating which ALU and Z results should generate interrupts |

The various privileged (§) and non-priveleged registers may be read from or written to by correspondingly privileged and non-priveleged control means for carrying out their respective functions. A privileged control means can of course, always access a non-priveleged TE register.

The above disclosure is to be taken as illustrative of the invention, not as limiting its scope or spirit. Numerous modifications and variations will become apparent to those skilled in the art after studying the above disclosure. For example, the invention is not restricted to RGB formats. Other digital formats such as YCC, or Composite Video Broadcast Standard (CVBS), can also be used. For the sake of simplification, an RGB format was assumed above.

Given the above disclosure of general concepts and specific embodiments, the scope of protection sought is to be defined by the claims appended hereto.

What is claimed is:

1. A method for controlling a real-time rendering engine comprising the steps of:

defining in a first region of system memory, a block header comprising an instructions count field for storing the number of instructions within a block;

an instruction identification field for defining the format of the corresponding instructions;

a hardware version number field for identifying the supported hardware version level; and enable/bypass fields for programmably enabling or bypassing rendering functions;

where the block header is to be processed before the corresponding instructions; and defining in a second region of said memory, flow-control instructions.

2. The method of claim 1, further comprising the step of defining in the block header a vertex replace-mode field for controlling automatic generation of 'strip' and 'fan' forms of triangle chains.

3. The method of claim 1, wherein said flow-control instructions comprise time-deferred vertex-based draw lists.

4. The method of claim 1, wherein said flow-control instructions comprise 'immediate' instructions for issuing commands to the rendering engine on a non-time-deferred basis.

5. A computer-readable memory device encoded with a block header for controlling a real-time rendering engine, comprising:

an instructions count field for storing the number of instructions within a block;

an instruction identification field for defining the format of the corresponding instructions;

a hardware version number field for identifying the supported hardware version level; and enable/bypass fields for programmably enabling or bypassing rendering functions.

6. The computer-readable memory device of claim 5, further comprising a list of flow-control instructions.

7. The computer-readable memory device of claim 5, wherein the flow-control instructions comprise time-deferred vertex-based draw lists.

8. The computer-readable memory device of claim 5, wherein said flow-control instructions comprise 'immediate' instructions for issuing commands to the rendering engine on a non-time-deferred basis.

9. The computer-readable memory device of claim 5, wherein the block header comprises a vertex replace-mode field for controlling automatic generation of 'strip' and 'fan' forms of triangle chains.

10. A system for controlling a real-time rendering engine comprising:

a central processing unit (CPU);

coupled to the CPU, a memory comprising a control program for defining in a first region of system memory, a block header comprising:

an instructions count field for storing the number of instructions within a block;

an instruction identification field for defining the format of the corresponding instructions;

a hardware version number field for identifying the supported hardware version level; and enable/bypass fields for programmably enabling or bypassing rendering functions;

coupled to the CPU, a memory comprising a control program for defining in a second region of system memory, flow-control instructions.

* * * * *